US012744632B2

(12) United States Patent
Zhang et al.

(10) Patent No.: US 12,744,632 B2
(45) Date of Patent: Sep. 22, 2026

(54) WIRELESS COMMUNICATION METHOD AND APPARATUS

(71) Applicant: Huawei Technologies Co., Ltd., Shenzhen (CN)

(72) Inventors: Lei Zhang, Shenzhen (CN); Lei Wang, Shanghai (CN); Yinggang Du, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 776 days.

(21) Appl. No.: 18/173,671

(22) Filed: Feb. 23, 2023

(65) Prior Publication Data

US 2023/0198703 A1 Jun. 22, 2023

Related U.S. Application Data

(63) Continuation of application No. PCT/CN2021/110949, filed on Aug. 5, 2021.

(30) Foreign Application Priority Data

Aug. 24, 2020 (CN) ........................ 202010857439.1

(51) Int. Cl.
*H04L 5/00* (2006.01)
*H04L 25/02* (2006.01)
*H04L 27/26* (2006.01)

(52) U.S. Cl.
CPC ...... *H04L 5/0048* (2013.01); *H04L 27/26136* (2021.01); *H04L 25/0224* (2013.01)

(58) Field of Classification Search
CPC ............. H04L 5/0048; H04L 27/26136; H04L 25/0224; H04L 27/2613; H04L 5/0051;
(Continued)

(56) References Cited

U.S. PATENT DOCUMENTS 10,165,559 B2 * 12/2018 Werner ................. H04L 1/0072
2011/0075760 A1 * 3/2011 Ogawa ................ H04J 13/0055
375/296

(Continued)

FOREIGN PATENT DOCUMENTS

CN 107437984 A 12/2017
CN 107548094 A 1/2018
CN 110912660 A 3/2020

OTHER PUBLICATIONS

3rd Generation Partnership Project; Technical Specification Group Radio Access Network; NR; Physical channels and modulation (Release 16). 3GPP TS 38.211 V16.2.0 (Jun. 2020). Mar. 2017. total 101 pages.

*Primary Examiner* — Oussama Roudani
(74) *Attorney, Agent, or Firm* — Slater Matsil, LLP

(57) ABSTRACT

A wireless communication method and apparatus. The method includes a terminal obtains a first sequence, and pads or truncates the first sequence to determine a second sequence having a reference signal length; the terminal outputs the second sequence to a network device; the network device receives the second sequence output by the terminal; the network device obtains, based on the second sequence, a third sequence of which a length is a first sequence length $2^m$; and based on the third sequence, the network device identifies active users and/or performs channel estimation. In the above technical solution, the terminal obtains the second sequence having the reference signal length by padding or truncating the obtained first sequence. The second sequence is output and used for identification of active users and/or channel estimation.

20 Claims, 8 Drawing Sheets

(58) Field of Classification Search
CPC ........ H04L 25/02; H04W 4/70; H04W 72/12; H04W 72/1263
See application file for complete search history.

(56) References Cited

U.S. PATENT DOCUMENTS

| | | | | |
|---|---|---|---|---|
| 2017/0230156 | A1* | 8/2017 | Fakoorian | H04W 4/70 |
| 2020/0014569 | A1* | 1/2020 | Huang | H04W 8/24 |
| 2020/0021414 | A1* | 1/2020 | Ding | H04L 27/233 |
| 2020/0322079 | A1* | 10/2020 | Cao | H04L 1/1819 |
| 2021/0152305 | A1* | 5/2021 | Wei | H04W 72/21 |
| 2021/0258925 | A1* | 8/2021 | Wang | H04L 27/2613 |
| 2021/0297225 | A1* | 9/2021 | Marinier | H04L 1/0061 |

* cited by examiner

WIRELESS COMMUNICATION METHOD AND APPARATUS

CROSS-REFERENCE TO RELATED APPLICATIONS

This application is a continuation of International Application No. PCT/CN2021/110949, filed on Aug. 5, 2021, which claims priority to Chinese Patent Application No. 202010857439.1, filed on Aug. 24, 2020. The disclosures of the aforementioned applications are hereby incorporated by reference in their entireties.

TECHNICAL FIELD

This application relates to the field of communication technologies, and in particular, to a wireless communication method and apparatus.

BACKGROUND

For massive connection scenarios of massive machine type communication (mMTC) (as shown in FIG. 1, black dots represent active users, and gray dots represent inactive users), there are a huge number of potential access users, and actually active users change dynamically. Therefore, an access method needs to have the characteristics of high capacity, low latency, and low costs. Allocating uplink resources for each user by a network device leads to huge signaling overheads. The design of a grant free access system is to be an inevitable choice in the future and has high practical significance. Grant free transmission may be understood as a type of contention-based uplink service data transmission. For uplink communication, the network device needs to configure different demodulation reference signals (DMRS) or preambles for different terminals. The network device identifies a user and performs channel estimation by receiving a reference signal (also referred to as a pilot) of user equipment (UE). A bottleneck for grant free access is the number of reference signals. The existing NR (New Radio) protocols support a very limited number of reference signals. Because there are too many UEs, an insufficiency of available reference signals becomes a bottleneck of network capacity.

The conventional technology proposes to utilize a method in the field of compressed sensing to resolve the problems of the number of reference signals and detection complexity, but the robustness and accuracy of detection cannot be ensured.

SUMMARY

Embodiments of this application propose a wireless communication method and apparatus, to ensure robust detection performance while providing a large-capacity reference signal. The technical solutions are as follows.

According to a first aspect, an embodiment of this application proposes a wireless communication method. The method includes obtaining a first sequence, where a length of the first sequence is $2^m$, and m is a positive integer; padding or truncating the first sequence to determine a second sequence having a reference signal length, where the reference signal length is determined based on first resource information; and outputting the second sequence, where the second sequence is used for identification of active users and/or channel estimation. This ensures robust detection performance while providing a large-capacity reference signal.

In a possible implementation, the first sequence is a Reed-Muller sequence, where the Reed-Muller sequence is determined based on a binary symmetric matrix with order m and a binary vector. Using the advantages of the Reed-Muller sequence, such as simple structure, rich structural characteristics, and reachable erasure channel capacity, to design reference signals can not only provide a huge number of reference signals to mark massive active users, but can also achieve low-complexity user detection and channel estimation.

In a possible implementation, the first resource information includes at least one of the following: a number of resource blocks, a resource element, or reference signal pattern indication information.

In a possible implementation, the first sequence includes a short first sequence and/or a long first sequence, where a length $L_{short}$ of the short first sequence is a value $2^m$ that is not greater than and closest to the reference signal length L, and a length $L_{long}$ of the long first sequence is a value $2^{m+1}$ that is greater than and closest to the reference signal length L.

In a possible implementation, the padding or truncating the first sequence includes determining to pad or truncate the first sequence based on the first sequence length, the reference signal length, and a determining threshold, to obtain the second sequence having the reference signal length, where the second sequence may be used for detection of active users and/or channel estimation, ensuring robust detection performance.

In a possible implementation, the padding the first sequence includes inserting elements into the first sequence based on a first sequence length to be matched, so that the first sequence length is the reference signal length, ensuring robust detection performance during detection of active users and/or channel estimation, where the first sequence length to be matched is a difference between the reference signal length and the first sequence length.

In a possible implementation, the inserting elements into the first sequence based on a first sequence length to be matched includes determining a uniform insertion gap based on a ratio of the first sequence length to the first sequence length to be matched; and inserting one element every uniform insertion gap, where a value of the inserted element includes a value of an element at its adjacent position multiplied by a first phase deflection value or 0. In this step, uniformly inserting elements into the first sequence allows for the structural characteristics of the first sequence to be less damaged, ensuring robust detection performance.

In a possible implementation, the inserting elements into the first sequence based on a first sequence length to be matched further includes dividing the first sequence into $L_{section}$ sections of which a length is a preset threshold, where $L_{section}$ is a ratio of the first sequence length to the preset threshold; and selecting M sections from the $L_{section}$ sections to insert elements, where M is a rounded-up ratio of the first sequence length to be matched to the preset threshold, and a value of the inserted element includes a value of an element at its adjacent position multiplied by a second phase deflection value or 0. In this step, dividing the first sequence into a plurality of sections and selecting some of the plurality of sections to insert elements allow for the structural characteristics of the first sequence to be less damaged, ensuring robust detection performance.

In a possible implementation, the inserting elements into the first sequence based on a first sequence length to be matched further includes selecting, according to a first rule, M positions in the first sequence to insert elements, so that the first sequence length is the reference signal length, where a value of the inserted element includes a value of an element at its adjacent position multiplied by a third phase deflection value or 0, and M is equal to the first sequence length to be matched. In this step, selecting, according to the first rule, a plurality of positions in the first sequence to insert elements allows for the structural characteristics of the first sequence to be less damaged, ensuring robust detection performance.

In a possible implementation, the determining to pad the first sequence based on the first sequence length, the reference signal length, and a determining threshold includes selecting a starting point in a reference signal to insert the first sequence; and inserting N elements at remaining positions in the reference signal, where a value of the inserted element includes each of values of the N elements in the first sequence from the selected starting point multiplied by a fourth phase deflection value or 0, and N is equal to a quantity of the remaining positions. In this step, inserting elements outside the first sequence allows for the structural characteristics of the first sequence not to be damaged, ensuring robust detection performance.

In a possible implementation, the padding or truncating the first sequence includes determining a first sequence second length to be matched as $L_{short\text{-}gap}=L-L_{short}$ and/or a first sequence third length to be matched as $L_{long\text{-}gap}=L_{long}-L$; comparing a ratio of $L_{short\text{-}gap}$ to $L_{long\text{-}gap}$ with a first determining threshold, and determining to pad or truncate the first sequence based on a first comparison result; or comparing a ratio of $L_{short\text{-}gap}$ to L with a second determining threshold, and determining to pad or truncate the first sequence based on a second comparison result; or comparing a ratio of $L_{long\text{-}gap}$ to L with a third determining threshold, and determining to pad or truncate the first sequence based on a third comparison result; or comparing a ratio of $L_{short\text{-}gap}$ to $L_{short}$ with a fourth determining threshold, and determining to pad or truncate the first sequence based on a fourth comparison result; or comparing a ratio of $L_{long\text{-}gap}$ to $L_{long}$ with a fifth determining threshold, and determining to pad or truncate the first sequence based on a fifth comparison result. In this step, setting the determining threshold and flexibly determining an extension method of padding or truncating the first sequence effectively resolve the problem that the first sequence length is limited and does not match the reference signal length, ensuring robust detection performance.

In a possible implementation, the determining to pad or truncate the first sequence based on a first comparison result includes, if the ratio of $L_{short\text{-}gap}$ to $L_{long\text{-}gap}$ is equal to the first determining threshold, padding the short first sequence or truncating the long first sequence; or if the ratio of $L_{short\text{-}gap}$ to $L_{long\text{-}gap}$ is less than the first determining threshold, padding the short first sequence; or if the ratio of $L_{short\text{-}gap}$ to $L_{long\text{-}gap}$ is greater than the first determining threshold, truncating the long first sequence. In this step, comparing the ratio of the second length to be matched to the third length to be matched with the first determining threshold and flexibly determining an extension method of padding or truncating the first sequence effectively resolve the problem that the first sequence length is limited and does not match the reference signal length, ensuring robust detection performance.

In a possible implementation, the determining to pad or truncate the first sequence based on a second comparison result includes, if the ratio of $L_{short\text{-}gap}$ to L is equal to the second determining threshold, padding the short first sequence or truncating the long first sequence; or if the ratio of $L_{short\text{-}gap}$ to L is less than the second determining threshold, padding the short first sequence; or if the ratio of $L_{short\text{-}gap}$ to L is greater than the second determining threshold, truncating the long first sequence. In this step, comparing the ratio of the second length to be matched to the reference signal length with the second determining threshold and flexibly determining an extension method of padding or truncating the first sequence effectively resolve the problem that the first sequence length is limited and does not match the reference signal length, ensuring robust detection performance.

In a possible implementation, the determining to pad or truncate the first sequence based on a third comparison result includes, if the ratio of $L_{long\text{-}gap}$ to L is equal to the third determining threshold, padding the short first sequence or truncating the long first sequence; or if the ratio of $L_{long\text{-}gap}$ to L is greater than the third determining threshold, padding the short first sequence; or if the ratio of $L_{long\text{-}gap}$ to L is less than the third determining threshold, truncating the long first sequence. In this step, comparing the ratio of the third length to be matched to the reference signal length with the third determining threshold and flexibly determining an extension method of padding or truncating the first sequence effectively resolve the problem that the first sequence length is limited and does not match the reference signal length, ensuring robust detection performance.

In a possible implementation, the determining to pad or truncate the first sequence based on a fourth comparison result includes, if the ratio of $L_{short\text{-}gap}$ to $L_{short}$ is equal to the fourth determining threshold, padding the short first sequence or truncating the long first sequence; or if the ratio of $L_{short\text{-}gap}$ to $L_{short}$ is less than the fourth determining threshold, padding the short first sequence; or if the ratio of $L_{short\text{-}gap}$ to $L_{short}$ is greater than the fourth determining threshold, truncating the long first sequence. In this step, comparing the ratio of the second length to be matched to the short first sequence length with the fourth determining threshold and flexibly determining an extension method of padding or truncating the first sequence effectively resolve the problem that the first sequence length is limited and does not match the reference signal length, ensuring robust detection performance.

In a possible implementation, the determining to pad or truncate the first sequence based on a fifth comparison result includes, if the ratio of $L_{long\text{-}gap}$ to $L_{long}$ is equal to the fifth determining threshold, padding the short first sequence or truncating the long first sequence; or if the ratio of $L_{long\text{-}gap}$ to $L_{long}$ is greater than the fifth determining threshold, padding the short first sequence; or if the ratio of $L_{long\text{-}gap}$ to $L_{long}$ is less than the fifth determining threshold, truncating the long first sequence. In this step, comparing the ratio of the third length to be matched to the long first sequence length with the fifth determining threshold and flexibly determining an extension method of padding or truncating the first sequence effectively resolve the problem that the first sequence length is limited and does not match the reference signal length, ensuring robust detection performance.

According to a second aspect, an embodiment of this application further proposes a wireless communication method. The method includes receiving a second sequence, where the second sequence is obtained by padding or truncating a first sequence; obtaining, based on the second sequence, a third sequence of which a length is a first sequence length, where a value of the first sequence length is $2^m$; and based on the third sequence, identifying active users and/or performing channel estimation.

In a possible implementation, the obtaining, based on the second sequence, a third sequence of which a length is a first sequence length includes despreading and combining the second sequence based on positions for padding or truncating the first sequence, to obtain the third sequence of which the length is the first sequence length.

In a possible implementation, the despreading and combining the second sequence based on positions for padding or truncating the first sequence includes, if a value of an element for padding the first sequence is a value of an element at its adjacent position multiplied by a first, second, or third phase deflection value, despreading the element at the padding position in the second sequence, and then combining the despread element at the padding position with the element at its adjacent position; or if a value of an element for padding the first sequence is each of values, multiplied by a fourth phase deflection value, of N elements in the first sequence inserted from a starting point selected from a reference signal, despreading the element at the padding position in the second sequence, and then combining the despread element at the padding position with the inserted N elements in the first sequence, where N is a difference between a reference signal length and the first sequence length; or if the value of the element for padding the first sequence is 0, extracting the first sequence from the second sequence; or if the first sequence is truncated, padding an element at a truncation position.

According to a third aspect, an embodiment of this application proposes a wireless communication apparatus. The apparatus includes a processing unit, configured to obtain a first sequence, where a value of a length of the first sequence is $2^m$; and the processing unit is further configured to pad or truncate the first sequence to determine a second sequence having a reference signal length, where the reference signal length is determined based on first resource information; and a transceiver unit, configured to output the second sequence, where the second sequence is used for identification of active users and/or channel estimation.

In a possible implementation, the first sequence is a Reed-Muller sequence, where the Reed-Muller sequence is determined based on a binary symmetric matrix with order m and a binary vector.

In a possible implementation, the first resource information includes at least one of a number of resource blocks, a resource element, or reference signal pattern indication information.

In a possible implementation, the first sequence includes a short first sequence and/or a long first sequence, where a length $L_{short}$ of the short first sequence is a value $2^m$ that is not greater than and closest to the reference signal length L, and a length $L_{long}$ of the long first sequence is a value $2^{m+1}$ that is greater than and closest to the reference signal length L.

In a possible implementation, the processing unit is specifically configured to determine to pad or truncate the first sequence based on the first sequence length, the reference signal length, and a determining threshold.

In a possible implementation, the padding the first sequence includes inserting elements into the first sequence based on a first sequence length to be matched, so that the first sequence length is the reference signal length, where the first sequence length to be matched is a difference between the reference signal length and the first sequence length.

In a possible implementation, the inserting elements into the first sequence based on a first sequence length to be matched includes determining a uniform insertion gap based on a ratio of the first sequence length to the first sequence length to be matched; and inserting one element every uniform insertion gap, where a value of the inserted element includes a value of an element at its adjacent position multiplied by a first phase deflection value or 0.

In a possible implementation, the inserting elements into the first sequence based on a first sequence length to be matched further includes dividing the first sequence into $L_{section}$ sections of which a length is a preset threshold, where $L_{section}$ is a ratio of the first sequence length to the preset threshold; and selecting M sections from the $L_{section}$ sections to insert elements, where M is a rounded-up ratio of the first sequence length to be matched to the preset threshold, and a value of the inserted element includes a value of an element at its adjacent position multiplied by a second phase deflection value or 0.

In a possible implementation, the inserting elements into the first sequence based on a first sequence length to be matched further includes selecting, according to a first rule, M positions in the first sequence to insert elements, so that the first sequence length is the reference signal length, where a value of the inserted element includes a value of an element at its adjacent position multiplied by a third phase deflection value or 0, and M is equal to the first sequence length to be matched.

In a possible implementation, the determining to pad the first sequence based on the first sequence length, the reference signal length, and a determining threshold includes selecting a starting point in a reference signal to insert the first sequence; and inserting N elements at remaining positions in the reference signal, where a value of the inserted element includes each of values of the N elements in the first sequence from the selected starting point multiplied by a fourth phase deflection value or 0, and N is equal to a quantity of the remaining positions.

In a possible implementation, the padding or truncating the first sequence includes determining a first sequence second length to be matched as $L_{short\text{-}gap}=L-L_{short}$ and/or a first sequence third length to be matched as $L_{long\text{-}gap}=L_{long}-L$; comparing a ratio of $L_{short\text{-}gap}$ to $L_{long\text{-}gap}$ with a first determining threshold, and determining to pad or truncate the first sequence based on a first comparison result; or comparing a ratio of $L_{short\text{-}gap}$ to L with a second determining threshold, and determining to pad or truncate the first sequence based on a second comparison result; or comparing a ratio of $L_{long\text{-}gap}$ to L with a third determining threshold, and determining to pad or truncate the first sequence based on a third comparison result; or comparing a ratio of $L_{short\text{-}gap}$ to $L_{short}$ with a fourth determining threshold, and determining to pad or truncate the first sequence based on a fourth comparison result; or comparing a ratio of $L_{long\text{-}gap}$ to $L_{long}$ with a fifth determining threshold, and determining to pad or truncate the first sequence based on a fifth comparison result.

In a possible implementation, the determining to pad or truncate the first sequence based on a first comparison result includes, if the ratio of $L_{short\text{-}gap}$ to $L_{long\text{-}gap}$ is equal to the first determining threshold, padding the short first sequence or truncating the long first sequence; or if the ratio of $L_{short\text{-}gap}$ to $L_{long\text{-}gap}$ is less than the first determining threshold, padding the short first sequence; or if the ratio of $L_{short\text{-}gap}$ to $L_{long\text{-}gap}$ is greater than the first determining threshold, truncating the long first sequence.

In a possible implementation, the determining to pad or truncate the first sequence based on a second comparison result includes, if the ratio of $L_{short\text{-}gap}$ to L is equal to the second determining threshold, padding the short first sequence or truncating the long first sequence; or if the ratio of $L_{short\text{-}gap}$ to L is less than the second determining threshold, padding the short first sequence; or if the ratio of $L_{short\text{-}gap}$ to L is greater than the second determining threshold, truncating the long first sequence.

In a possible implementation, the determining to pad or truncate the first sequence based on a third comparison result includes, if the ratio of $L_{long\text{-}gap}$ to L is equal to the third determining threshold, padding the short first sequence or truncating the long first sequence; or if the ratio of $L_{long\text{-}gap}$ to L is greater than the third determining threshold, padding the short first sequence; or if the ratio of $L_{long\text{-}gap}$ to L is less than the third determining threshold, truncating the long first sequence.

In a possible implementation, the determining to pad or truncate the first sequence based on a fourth comparison result includes, if the ratio of $L_{short\text{-}gap}$ to $L_{short}$ is equal to the fourth determining threshold, padding the short first sequence or truncating the long first sequence; or if the ratio of $L_{short\text{-}gap}$ to $L_{short}$ is less than the fourth determining threshold, padding the short first sequence; or if the ratio of $L_{short\text{-}gap}$ to $L_{short}$ is greater than the fourth determining threshold, truncating the long first sequence.

In a possible implementation, the determining to pad or truncate the first sequence based on a fifth comparison result includes, if the ratio of $L_{long\text{-}gap}$ to $L_{long}$ is equal to the fifth determining threshold, padding the short first sequence or truncating the long first sequence; or if the ratio of $L_{long\text{-}gap}$ to $L_{long}$ is greater than the fifth determining threshold, padding the short first sequence; or if the ratio of $L_{long\text{-}gap}$ to $L_{long}$ is less than the fifth determining threshold, truncating the long first sequence.

For beneficial effects of the wireless communication apparatus, refer to the beneficial effects in the first aspect and the possible implementations thereof.

According to a fourth aspect, an embodiment of this application proposes a wireless communication apparatus. The apparatus includes a transceiver unit, configured to receive a second sequence, where the second sequence is obtained by padding or truncating a first sequence; and a processing unit, configured to obtain, based on the second sequence, a third sequence of which a length is a first sequence length, where a value of the first sequence length is $2^m$; and the processing unit is further configured to: based on the third sequence, identify active users and/or perform channel estimation.

In a possible implementation, the processing unit is specifically configured to despread and combine the second sequence based on positions for padding or truncating the first sequence, to obtain the third sequence of which the length is the first sequence length.

In a possible implementation, the despreading and combining the second sequence based on positions for padding or truncating the first sequence includes, if a value of an element for padding the first sequence is a value of an element at its adjacent position multiplied by a first, second, or third phase deflection value, despreading the element at the padding position in the second sequence, and then combining the despread element at the padding position with the element at its adjacent position; or if a value of an element for padding the first sequence is each of values, multiplied by a fourth phase deflection value, of N elements in the first sequence inserted from a starting point selected from a reference signal, despreading the element at the padding position in the second sequence, and then combining the despread element at the padding position with the inserted N elements in the first sequence, where N is a difference between a reference signal length and the first sequence length; or if the value of the element for padding the first sequence is 0, extracting the first sequence from the second sequence; or if the first sequence is truncated, padding an element at a truncation position.

According to a fifth aspect, an embodiment of this application proposes a wireless communication apparatus, including at least one processor, where the processor is configured to execute a program stored in a memory, and the program, when executed, causes the wireless communication apparatus to perform the method in the first aspect and the possible implementations thereof, or the method in the second aspect and the possible implementations thereof.

In a possible implementation, the memory storing the program is further included in the apparatus, and optionally, the processor and the memory are integrated together. In another possible implementation, the memory is separate from the apparatus.

According to a sixth aspect, an embodiment of this application proposes a wireless communication apparatus, including an input/output interface and a logic circuit, where the input/output interface is configured to obtain a first sequence; the logic circuit is configured to perform the method in the first aspect and the possible implementations thereof to determine a second sequence based on the first sequence; and the input/output interface is further configured to output the second sequence.

In a possible implementation, the apparatus is a chip.

According to a seventh aspect, an embodiment of this application proposes a wireless communication apparatus, including an input/output interface and a logic circuit, where the input/output interface is configured to obtain a second sequence; and the logic circuit is configured to perform the method in the second aspect and the possible implementations thereof to determine a third sequence based on the second sequence; and based on the third sequence, identify active users and/or perform channel estimation.

In a possible implementation, the apparatus is a chip.

According to an eighth aspect, an embodiment of this application provides a computer-readable storage medium. The computer-readable storage medium stores a computer program, and when the computer program is executed by a processor, the method in the first aspect and the possible implementations thereof is performed, or the method in the second aspect and the possible implementations thereof is performed.

According to a ninth aspect, an embodiment of this application further provides a computer program product. The computer program product, when running on a computer, causes the method in the first aspect and the possible implementations thereof to be performed, or the method in the second aspect and the possible implementations thereof to be performed.

According to a tenth aspect, an embodiment of this application further provides a wireless communication system, including the apparatus in the third aspect and the possible implementations thereof and the apparatus in the fourth aspect and the possible implementations thereof.

BRIEF DESCRIPTION OF THE DRAWINGS

To describe the technical solutions in embodiments of this application or in the conventional technology more clearly, the following briefly introduces the accompanying drawings used in describing embodiments or the conventional technology. It is clear that the accompanying drawings in the following descriptions show some embodiments of this application, and a person of ordinary skill in the art may still derive other drawings from these accompanying drawings without creative efforts.

DETAILED DESCRIPTION OF ILLUSTRATIVE EMBODIMENTS

To make the objectives, technical solutions, and advantages of embodiments of this application clearer, the following further describes specific implementations of embodiments of this application in detail with reference to the accompanying drawings.

It should be noted that, the term "and/or" in this application describes only an association relationship for describing associated objects and represents that three relationships may exist. For example, A and/or B may represent the following three cases: Only A exists, both A and B exist, and only B exists. In the specification and claims in embodiments of this application, the terms "first", "second", and the like are intended to distinguish between different objects but do not indicate a particular order of the objects. For example, a first sequence, a second sequence, and the like are used to distinguish between different sequences, but are not used to describe a specific order of the target objects. In embodiments of this application, the terms "example", "for example", "as an example", and the like are used to represent giving an example, an illustration, or a description. Any embodiment or design described with "example", "for example", or "as an example" in embodiments of this application should not be explained as being preferred or advantageous over another embodiment or design. Exactly, the use of the term "example", "for example", or the like is intended to present a related concept in a specific manner. In the description of embodiments of this application, unless otherwise stated, "a plurality of" means two or more.

First, the related concepts in embodiments of this application are briefly described.

At present, in the TS 38.211 standard of NR, a DMRS has two configurations: Configuration 1 and Configuration 2. A DMRS in each configuration may be a single-symbol configuration or a double-symbol configuration. Therefore, there are a total of four DMRS configurations in NR.

In order to support multi-user or multi-stream transmission, a plurality of DMRS ports are defined in the standard. Different DMRS ports are orthogonal to each other, in either frequency division or code division manner, where frequency division means that different DMRS ports occupy different frequency domain resources, and code division means that different DMRS ports occupy the same time-frequency resources, but DMRS sequences use different orthogonal codes or different cyclic shift modes.

Different DMRS configurations support different maximum DMRS port numbers. The four configurations, namely, single-symbol Configuration 1, double-symbol Configuration 1, single-symbol Configuration 2, and double-symbol Configuration 2, support a maximum of 4, 8, 6, and 12 DMRS ports, respectively.

Figure 1:
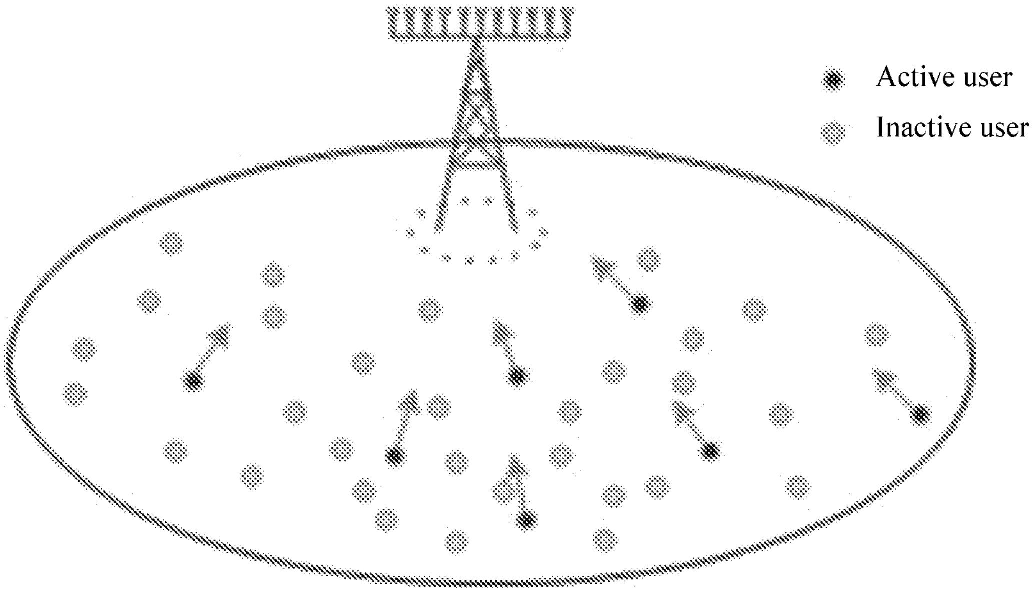
FIG. 1 is a schematic diagram of a massive connection scenario of massive internet of things communication according to an embodiment of this application.
Figure 2:
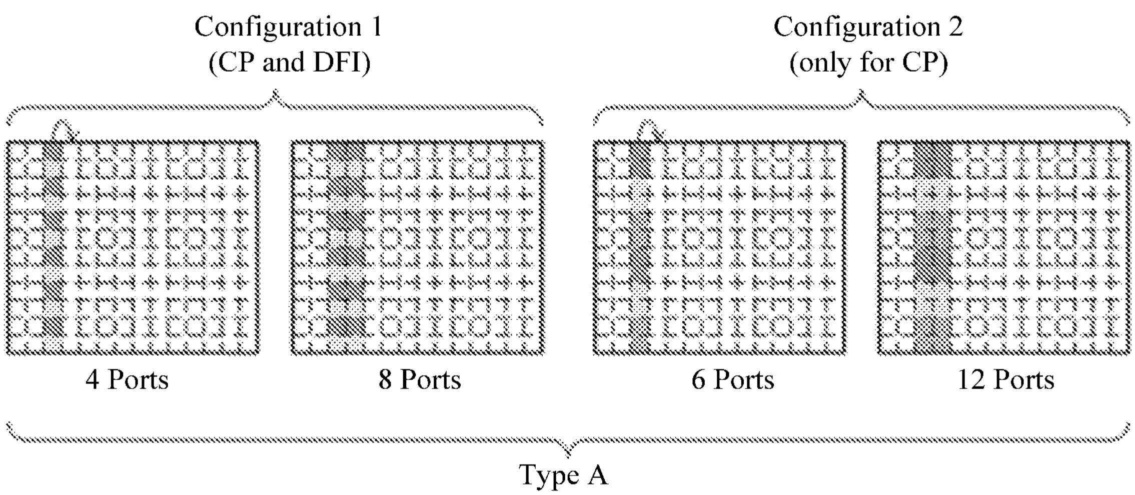
FIG. 2 is a schematic diagram of an NR demodulation reference signal pattern according to an embodiment of this application.

In the TS 38.211 standard of NR, there are two types of DMRSs used for uplink transmission: front-loaded DMRS and additional DMRS. The front-loaded DMRS is generally located in front of a scheduling resource, so that a network device can perform an operation such as channel estimation as early as possible to reduce latency. When a high-speed scenario is considered, it is required to utilize the additional DMRS located behind the scheduling resource. The specific DMRS location is different depending on the mapping type: For example, for the mapping type A, the front-loaded DMRS is located on the third and fourth orthogonal frequency division multiplexing (OFDM) symbols of a slot; for the mapping type B, the front-loaded DMRS is located on the first scheduled OFDM symbol, where the mapping type A is shown in FIG. 2.

The existing NR DMRS design supports a limited number of orthogonal DMRS ports, and can only support a maximum of 12 orthogonal ports. When there are too many UEs, and the number of available reference signals is insufficient, it is impossible to distinguish each user by the reference signal, and the users need to share the reference signals. However, when a reference signal collision occurs, a base station cannot perform accurate user detection and channel estimation, and cannot successfully demodulate user data.

In a possible implementation, a large-capacity reference signal design scheme is proposed to utilize a method in the field of compressed sensing to resolve the problems of the number of reference signals and detection complexity. Specifically, the method includes using RM codes (Reed Muller codes) for reference signal design. As very important linear block codes, RM codes have the advantages such as simple structure, rich structural characteristics, and reachable erasure channel capacity. Due to these advantages, RM codes are widely used in the industry, for example, in deep space communication systems (such as Mars exploration) and cellular communication systems (such as LTE). Designing reference signals based on RM codes can give full play to the advantages of both "ultra-large sequence space" and "extremely low complexity", which can not only provide a huge number of reference signals to mark massive active users, but can also achieve low-complexity user detection and channel estimation.

A second-order RM sequence of length $2^m$ in the solution is defined as:

$$\phi_{P,b}(j) = A^* i^{(2b+Pa_{j-1})^T} a_{j-1},\ j = 1, \ldots, 2^m,$$

where $\phi_{P,b}(j)$ is a value of element j in the second-order RM sequence, A is an amplitude normalization factor, $i^2=-1$, P is a binary symmetric matrix of m rows and m columns, b is a binary vector of length m, and $a_{j-1}$ is a binary vector of length m and is converted from an integer value j−1. There are $$2^{\frac{m(m+1)}{2}}$$

different P and $2^m$ different b in total; that is, a maximum of $$2^{\frac{m(m+3)}{2}}$$

sequences can be generated.

It can be seen from the generation expression of the RM sequence that for each fixed P matrix (analogous to a root of a ZC sequence), a space of $2^m$ orthogonal RM sequences can be generated by changing the value of the vector b. RM sequences constructed using different P matrices are non-orthogonal.

Such a sequence generation manner can provide a large number of reference signal sequences, which adapts to the requirements for large-scale (massive) access, increases a success rate of UE identification (or detection) by the network device based on the reference signal sequence, and reduces a probability of a collision between reference signals of different terminals. In addition, because a sequence space of different second-order RM sequences is very large, and sequence elements are simple, consisting only of real numbers (±1, the diagonal elements of the P matrix being 0), or of real numbers and pure imaginary numbers (±1, ±i, the diagonal elements of the P matrix being not all 0), during the detection of the reference signal sequence generated based on the second-order RM sequence, a fast reconstruction algorithm can be used to greatly reduce the complexity of the reference signal sequence detection.

In an actual system, the RM sequence is used for reference signal design, and when a reference signal or codebook sequence length required does not satisfy a $2^m$ RM sequence length, there is a mismatch between the RM sequence length and the reference signal length. The length of the RM sequence generated by all the existing algorithms is in the form of $2^m$, m being any positive integer. However, in the actual system, the reference signal length required is not in the form of $2^m$. For example, in the NR protocol, the reference signal sequence length required is an integer multiple of $N_{RB}$ (for example, $6{*}N_{RB}$ or $4{*}N_{RB}$), where $N_{RB}$ is the number of resource blocks (RB). Such a sequence length mismatch limits the application scenarios of the RM sequence.

Embodiments of this application provide a wireless communication method to resolve the technical problem in the foregoing technical solution. It can be understood that embodiments of this application can be applied to a baseband signal processing module of a wireless communication system in which large-scale terminal access exists. The baseband signal processing module is located at a terminal side. When a terminal has uplink data to send, its baseband signal processing module performs a process described in embodiments of this application. In this method, a first sequence of length $2^m$ is first obtained, where m is a positive integer. Then, a second sequence having the reference signal length is determined by padding or truncating the first sequence, where the reference signal length is determined based on first resource information. Finally, a second sequence for identification of active users and/or channel estimation is output.

Figure 3:
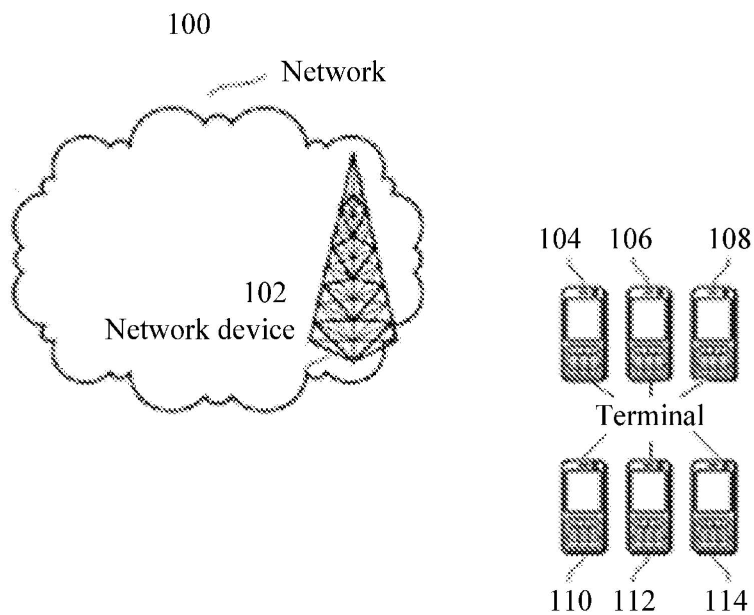
FIG. 3 is a schematic diagram of a communication system according to an embodiment of this application.

FIG. 3 is a schematic diagram of a communication system to which an embodiment of this application is applied. As shown in FIG. 3, the communication system 100 may include a network device 102 and terminals 104 to 114 that are connected in a wireless, wired, or another manner.

A network in the embodiments of the application may be a public land mobile network (PLMN), a D2D (Device to Device) network, an M2M (Machine to Machine) network, or another network. FIG. 3 is merely an example simplified schematic diagram. The network may further include other network devices, which are not shown in FIG. 3.

In actual application scenarios, the technical solutions in embodiments of this application can be applied to various communication systems, for example, a long term evolution (LTE) system, an LTE frequency division duplex (FDD) system, LTE time division duplex (TDD), a 5G communication system, and a future wireless communication system.

Various embodiments are described in this application with reference to a terminal. The terminal may also be user equipment UE, a terminal device, an access terminal, a subscriber unit, a subscriber station, a mobile, a mobile station, a remote station, a remote terminal, a mobile device, a user terminal, a wireless communication device, a user agent, or a user apparatus. The access terminal may be a cellular phone, a cordless phone, a session initiation protocol (SIP) phone, a wireless local loop (WLL) station, a personal digital assistant (PDA), a handheld device having a wireless communication function, a computing device or another processing device connected to a wireless modem, a vehicle-mounted device, a wearable device, a virtual reality (VR) terminal device, an augmented reality (AR) terminal device, a wireless device in industrial control, a wireless device in self driving, a wireless device in remote medical, a wireless device in smart grid, a wireless device in transportation safety, a wireless device in smart city, a wireless device in smart home, a terminal device in a future wireless communication system, or the like.

This application describes various embodiments with reference to a network device. The network device may be a device for communicating with the terminal. For example, the network device may be an evolved NodeB (Evolutional Node B, "eNB" or "eNodeB" for short) in an LTE system, or a network side device in a 5G network; or the network device may be a relay station, an access point, a transmitting and receiving point (TRP), a transmitting point (TP), a mobile switching center and a device that assumes the function of a base station in device-to-device (D2D), vehicle-to-everything (V2X), and machine-to-machine (M2M) communication, a device that assumes the function of a base station in a future communication system, or the like.

A wireless communication method provided in an embodiment of this application is described in detail below. In this embodiment of this application, the wireless communication method may be applied to the terminal side.

In a possible implementation, the wireless communication method provided in this embodiment of this application is implemented by the following steps.

In a first step, a first sequence of length $2^m$ is obtained, where m is a positive integer.

In a possible implementation, the first sequence is a Reed-Muller sequence (hereinafter referred to as "RM sequence"), where the RM sequence is determined based on a binary symmetric matrix with order m and a binary vector.

In a second step, the first sequence is padded or truncated to determine a second sequence having a reference signal length, where the reference signal length is determined based on first resource information. In a possible implementation, the first resource information includes at least one of a number of resource blocks, a resource element, or reference signal pattern indication information.

In a third step, a second sequence for identification of active users and/or channel estimation is output.

Next, the second step is described in detail. Specifically, based on a first sequence length, the reference signal length, and a determining threshold, it is determined to pad or truncate the first sequence, so that the first sequence length is matched to the reference signal length to obtain the second sequence having the reference signal length.

For example, the above-mentioned first sequence is an RM sequence, and the following separately describes matching the RM sequence length to the reference signal length using an extension method of padding or truncating the RM sequence.

1. Padding the RM Sequence to Match the RM Sequence Length to the Reference Signal Length.

When the RM sequence length is less than the reference signal length, an RM sequence length to be matched (that is, a first sequence length to be matched) is first determined as a difference between the reference signal length and the RM sequence length. Then, elements are inserted into the RM sequence based on the RM sequence length to be matched, so that the RM sequence length is the reference signal length.

In embodiments of this application, there are four cases for matching the RM sequence length by padding the RM sequence, and the four cases are described below.

Figure 4:
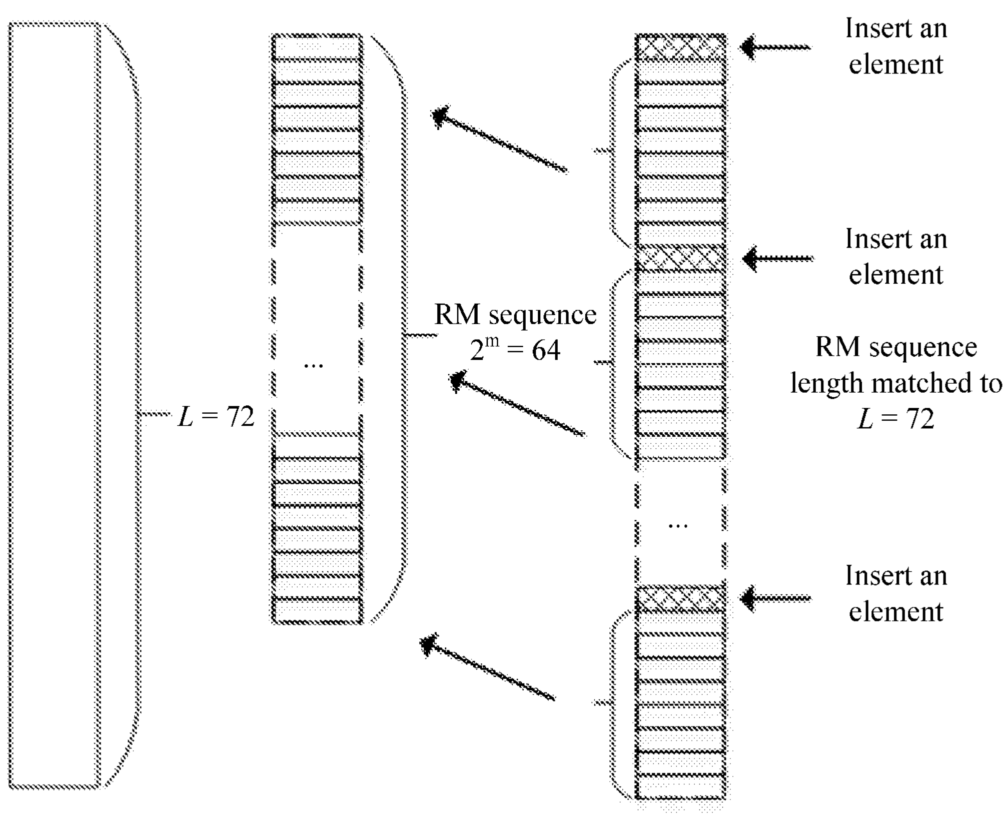
FIG. 4 is a schematic diagram of uniformly inserting elements into an RM sequence according to an embodiment of this application.

Embodiment 1: Uniformly Inserting Elements into an RM Sequence to Pad the RM Sequence (as Shown in FIG. 4)

First, an order m of a binary symmetric matrix for generating the RM sequence is determined. In a possible implementation, a terminal determines the order m based on a length of a reference signal. In embodiments of this application, the reference signal length may be directly configured by a network device for the terminal, or may be specified by a protocol. In embodiments of this application, a manner of obtaining the reference signal length is not specifically limited. A length of the RM sequence is $2^m$. If an integer g makes the RM sequence length $2^g$ closest to the reference signal length L, the integer g is determined as the order m. Alternatively, the order m is obtained from configuration information received from the network device, where the network device may specify a value of m and notify the value to the terminal through the configuration information. Alternatively, the order m is determined based on the number of resource elements for sending the reference signal. Alternatively, the order m is determined based on the number of resource blocks for sending the reference signal. Alternatively, the order m is determined based on reference signal pattern indication information. The above methods for determining the order m allow for the RM sequence length to be a value $2^m$ that is not greater than and closest to the reference signal length L.

Then, for the reference signal length or codebook sequence length L, an RM sequence length to be matched (that is, a first sequence length to be matched) is denoted as $L_{padding}=L-2^m$. First, a uniform insertion gap is determined based on a ratio of the RM sequence length to the RM sequence length to be matched; that is, the uniform insertion gap $$L_{gap}=\left\lfloor\frac{2^m}{L_{padding}}\right\rfloor,$$

where $\lfloor\cdot\rfloor$ is a rounding-down operation. Then, one element is inserted every uniform insertion gap $L_{gap}$ to match the RM sequence length to the reference signal length L. A value of the inserted element may be a value of an element at its adjacent position multiplied by a first phase deflection value, or may be 0. The adjacent position may be a previous position of the inserted element or a subsequent position of the inserted element. Specifically, a starting point is specified in the RM sequence of length $2^m$, to uniformly insert elements at intervals of $L_{gap}$ to pad to the length L. The initial insertion point includes, but is not limited to, the first element of the RM sequence from which the elements are inserted every $L_{gap}$ positions toward the back, or the last element of the RM sequence from which the elements are inserted every $L_{gap}$ position toward the front. If the value of the element at the adjacent position of the inserted element is $r_j$, j=1, 2, . . . , $2^m$, the value of the inserted element is $r_j*e^{i*\varphi}$, where $0\le\varphi\le2\pi$. In particular, when $\varphi=0$, the value of the inserted element is the same as the value of the element at its adjacent position, that is, $r_j$; and when $\varphi=\pi$, the value of the inserted element is opposite to the value of the element at its adjacent position, that is, $-r_j$.

In this embodiment of this application, for example, L=72; in other words, L is a reference signal length that is 6 times the number of resource blocks. Taking an RM sequence length closest to the length L=72, that is, m=6, corresponding to an RM sequence length $2^m=64$, an RM sequence length to be matched $L_{padding}=72-64=8$, and a uniform insertion gap $$L_{gap}=\left\lfloor\frac{64}{8}\right\rfloor=8.$$

Assuming that elements of the RM sequence are denoted as $[r_1, r_2, \ldots, r_{64}]$, a possible solution for uniformly inserting elements to pad the RM sequence is $[r_1, r_1, r_2, \ldots, r_8, r_9, r_9, r_{10}, \ldots, r_{16}, r_{17}, r_{17}, r_{18}, \ldots, r_{24}, r_{25}, r_{25}, r_{26}, \ldots, r_{56}, r_{57}, r_{57}, r_{58}, \ldots, r_{64}]$.

In another possible implementation, for the gap $L_{gap}$ of uniform insertion for the RM sequence, a starting point is specified in the RM sequence of length $2^m$, to uniformly insert elements at intervals of $L_{gap}$ to pad to the length L, where the value of the inserted element is 0. In this case, the RM sequence may be multiplied by a power boosting factor ρ. When ρ=1, no power boosting is performed; and when $$\rho = \sqrt{\frac{L}{2^m}},$$

power is boosted to be the same power as a transmitted uplink data portion.

It should be noted that, for the case that the value of the inserted element is the value of the element at its adjacent position multiplied by the first phase deflection value, after receiving the padded RM sequence, the network device needs to despread the element at the interpolation position, and then combine the despread element at the padding position with the element at its adjacent position to obtain another signal of which a length is the RM sequence length $2^m$, or may extract elements at positions of the original RM sequence to obtain another signal of which a length is the RM sequence length $2^m$. A detection algorithm corresponding to structural characteristics of the RM sequence is utilized for processing. The detection algorithm is, for example, a fast detection algorithm for the RM sequence, which recovers a binary symmetric matrix P and a binary vector through a shift operation and Hadamard transform. A generation expression of an RM sequence can be used to recover a corresponding RM sequence, and channel information of a corresponding user can be estimated based on the RM sequence. The RM sequence is multiplied by the channel information to obtain a multiplication result. The multiplication result is subtracted from the received signal to obtain a residual signal. The above operations are repeated on the residual signal until all RM sequences are recovered. A conventional detection algorithm, such as a method based on a related operation on a received signal and a local sequence, may also be used for processing. An enhanced detection algorithm, such as a sparse recovery detection algorithm based on compressed sensing, may also be used for processing. In embodiments of this application, the above detection algorithms are not specifically limited. Specifically, in this embodiment of this application, the value of the element at the adjacent position of the inserted element is $r_j$, j=1, 2, . . . , $2^m$, and the value of the inserted element is $\tilde{r}_j$, $\tilde{r}_j=r_j*e^{i*\varphi}$, where $0\leq\varphi\leq 2\pi$. The inserted element is despread as $\tilde{r}_j*e^{-i*\varphi}$, and then combined into $$\frac{r_j + \tilde{r}_j * e^{-i^*\varphi}}{2}.$$

For the case that the value of the inserted element is 0, after receiving the padded RM sequence, the network device extracts elements at positions of the original RM sequence to obtain another signal of which a length is the RM sequence length $2^m$. A detection algorithm corresponding to structural characteristics of the RM sequence is utilized for processing. A conventional detection algorithm, such as a method based on a related operation on a received signal and a local sequence, may also be used for processing. An enhanced detection algorithm, such as a sparse recovery detection algorithm based on compressed sensing, may also be used for processing. In embodiments of this application, the above detection algorithms are not specifically limited.

Figure 5:
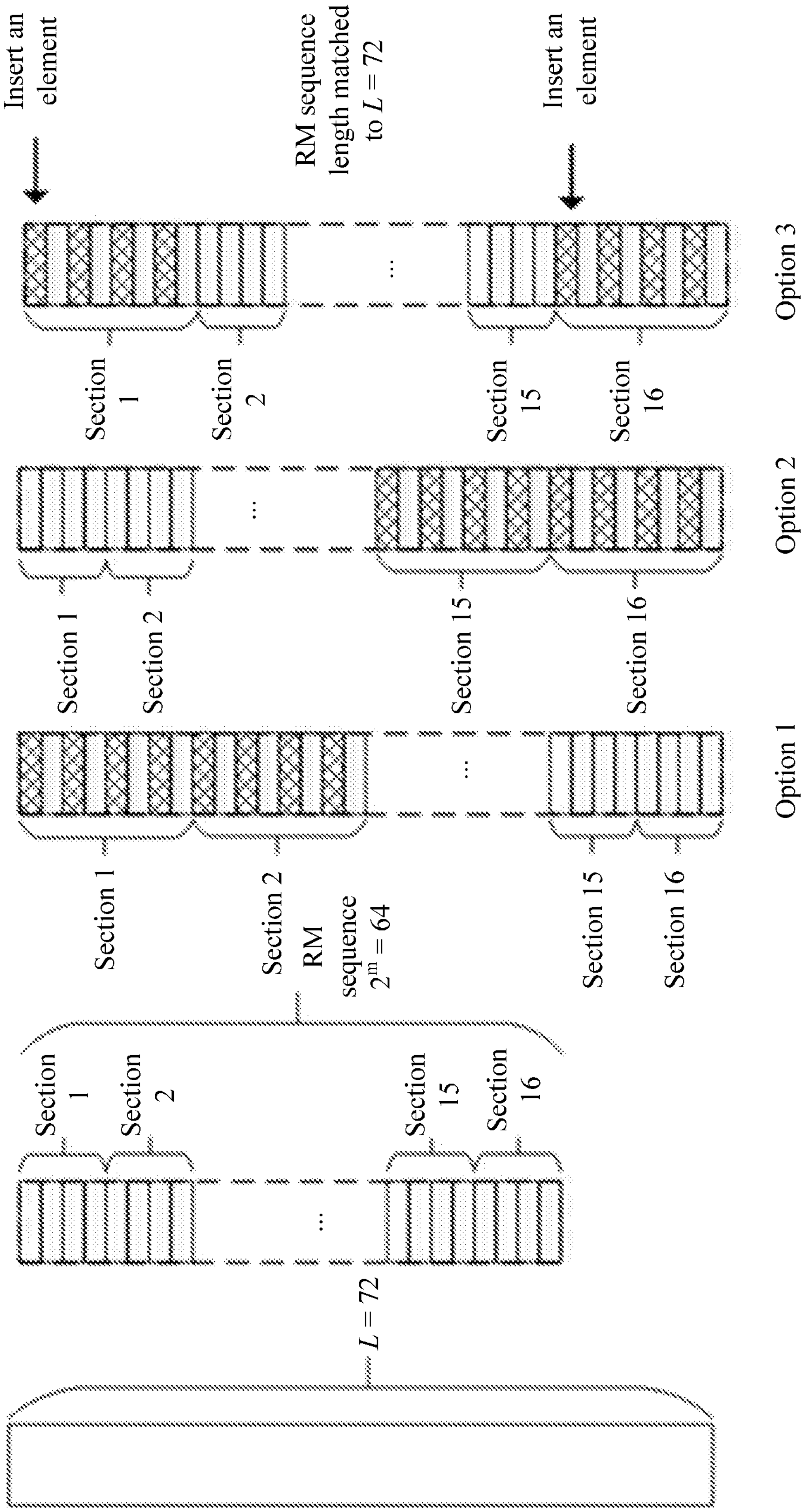
FIG. 5 is a schematic diagram of segmenting an RM sequence and inserting elements into selected sections according to an embodiment of this application.

Embodiment 2: Segmenting an RM Sequence, and Selecting Some Sections to Insert Elements to Pad the RM Sequence (as Shown in FIG. 5)

First, an order m of a binary symmetric matrix for generating the RM sequence is determined. A specific determining method is the same as that in Embodiment 1, and details are not described herein again.

Then, for a reference signal length or codebook sequence length within the range of $2^m<L<2^{m+1}$, the same segmentation method may be employed, and elements are inserted into the selected sections to match the RM sequence length to the reference signal length L. Specifically, an RM sequence length to be matched (that is, a first sequence length to be matched) is denoted as $L_{padding}=L-2^m$. In this embodiment of this application, how to pad the RM sequence is described by taking a limited number of sequence lengths (such as a length of an integer multiple of the number of RBs) configurable within the range of $2^m<L<2^{m+1}$ as an example.

In this embodiment of this application, the number of configurable sequence lengths within the range of $2^m<L<2^{m+1}$ is n, and the sequence lengths are $L_1, L_2, \ldots, L_n$, respectively. RM sequence lengths to be matched, $L_{padding,1}, L_{padding,2}, \ldots, L_{padding,n}$, for the sequences relative to the RM sequence are calculated, from which the greatest common divisor is taken and denoted as $L_{gcd}$. The RM sequence is divided into $L_{section}$ sections of which a length is a preset threshold $L_{gcd}$ where $$L_{section} = \frac{2^m}{L_{gcd}}.$$

Then, M sections need to be selected from the $L_{section}$ sections of the RM sequence to insert elements, where M is a rounded-up ratio of the RM sequence length to be matched to the preset threshold. A value of the inserted element may be a value of an element at its adjacent position multiplied by a second phase deflection value, or may be 0. In this embodiment of this application, a method for selecting the sections with elements to be inserted includes, but is not limited to, selecting, from front to back, $$\left\lceil \frac{L_{padding,i}}{L_{gcd}} \right\rceil$$

sections starting from the first section, where $\lceil\bullet\rceil$ is a rounding-up operation. The $$\left\lceil \frac{L_{padding,i}}{L_{gcd}} \right\rceil$$

sections may also be selected, from back to front, starting from the last section. A method of first selecting the first and last sections and then expanding to the middle may also be employed.

For the selected sections with elements to be inserted, a method of comb-like uniform insertion is used. For example, for section i, elements $[r_1, r_2, \ldots, r_{gcd}]$ corresponding to the RM sequence in this section are placed at positions 1, 3, 5, . . . , $2*L_{gcd}-1$, and values of elements at the adjacent positions multiplied by the second phase deflection value, that is, $r_1*e^{i*\varphi}$, $r_2*e^{i*\varphi}$, . . . , $r_{gcd}*e^{i*\varphi}$, are placed at positions 2, 4, 6, . . . , $2*L_{gcd}$, where $0\leq\varphi\leq 2\pi$. When $\varphi=0$, the values of the inserted elements are the same as those of the elements of the section of the original RM sequence, that is, $[r_1, r_2, \ldots, r_{gcd}]$. When $\varphi=\pi$, the values of the inserted elements are opposite to those of the elements of the section of the original RM sequence, that is, $[-r_1, -r_2, \ldots, -r_{gcd}]$. Similarly, the elements of the section of the original RM sequence may also be sequentially placed at the positions 2, 4, 6, . . . , $2*L_{gcd}$ of this section, and the values of the elements at their adjacent positions multiplied by the second phase deflection value are uniformly inserted at the positions 1, 3, 5, . . . , $2*L_{gcd}-1$.

In this embodiment of this application, for example, m=6; that is, the reference signal length L is an integer multiple of the number of RBs, and indexes of sections with elements to be inserted are shown in Table 1. In embodiments of this application, a manner of selecting indexes of sections with elements to be inserted includes, but is not limited to, manners in Table 1.

TABLE 1

| Reference signal length L | RM sequence length closest to L | RM sequence length to be matched $L_{padding}$ | Indexes of sections with elements to be inserted $L_{gcd}=4$, $L_{section}=16$ |
|---|---|---|---|
| 6 RB = 72 | m = 6, $2^m=64$ | 8 | Option 1: 1, 2;<br>Option 2: 15, 16;<br>Option 3: 1, 16 |
| 7 RB = 84 | m = 6, $2^m=64$ | 20 | Option 1: 1, 2, 3, 4, 5;<br>Option 2: 12, 13, 14, 15, 16;<br>Option 3: 1, 16, 2, 15, 3 |
| 8 RB = 96 | m = 6, $2^m=64$ | 32 | Option 1: 1, 2, 3, 4, 5, 6, 7, 8;<br>Option 2: 9, 10, 11, 12, 13, 14, 15, 16;<br>Option 3: 1, 16, 2, 15, 3, 14, 4, 13 |
| 9 RB = 108 | m = 6, $2^m=64$ | 44 | Option 1: 1, 2, 3, 4, 5, 6, 7, 8, 9, 10, 11;<br>Option 2: 6, 7, 8, 9, 10, 11, 12, 13, 14, 15, 16;<br>Option 3: 1, 16, 2, 15, 3, 14, 4, 13, 5, 12, 6 |
| 10 RB = 120 | m = 6, $2^m=64$ | 56 | 1, 2, 3, 4, 5, 6, 7, 8, 9, 10, 11, 12, 13, 14 |

In another possible implementation, for the selected sections for insertion, a comb-like uniform insertion method is employed, and the value of the inserted element may also be 0. In this case, the RM sequence may be multiplied by a power boosting factor ρ. When ρ=1, no power boosting is performed; and when $$\rho=\sqrt{\frac{L}{2^m}},$$

power is boosted to be the same power as a transmitted uplink data portion.

It should be noted that, for the case that the value of the inserted element in the selected section is the value of the element at its adjacent position multiplied by the second phase deflection value or 0, after receiving the padded RM sequence, the network device performs the same operations as those in Embodiment 1, and details are not described herein again.

Figure 6:
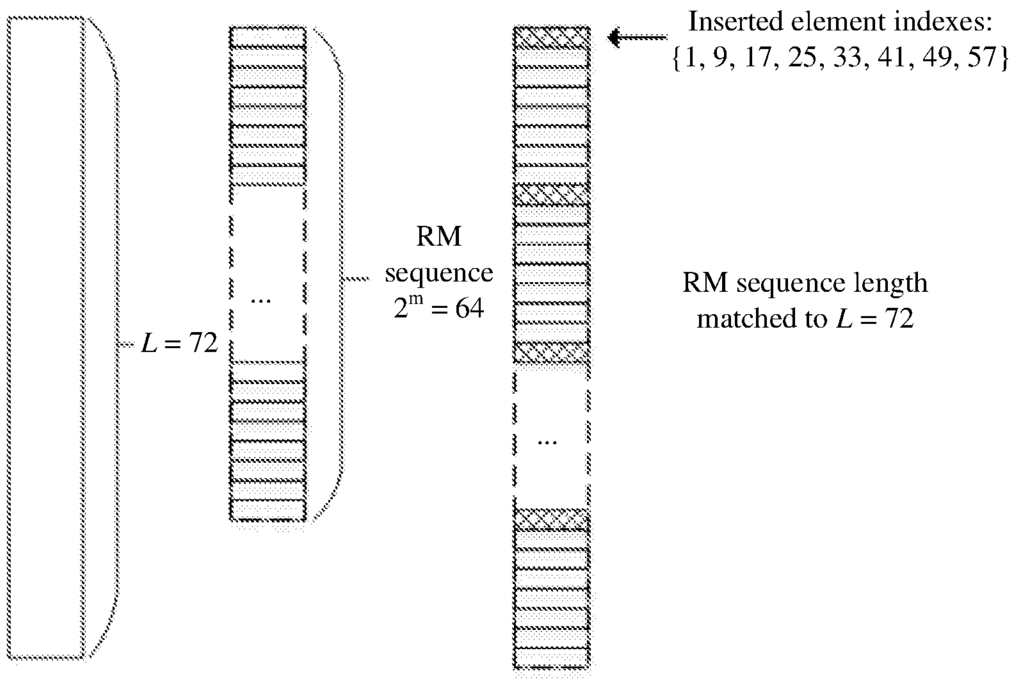
FIG. 6 is a schematic diagram of selecting positions in an RM sequence at which elements are to be inserted according to a first rule and inserting the elements according to an embodiment of this application.

Embodiment 3: Selecting Positions in an RM Sequence at which Elements are to be Inserted According to a First Rule and Inserting the Elements to Pad the RM Sequence (as Shown in FIG. 6)

First, an order m of a binary symmetric matrix for generating the RM sequence is determined. A specific determining method is the same as that in Embodiment 1, and details are not described herein again.

Then, for the reference signal length or codebook sequence length L, an RM sequence length to be matched (that is, a first sequence length to be matched) is denoted as $L_{padding}=L-2^m$. Within the range of the RM sequence length, M positions are sequentially selected according to the first rule to insert elements and pad to L. A value of the inserted element includes a value of an element at its adjacent position multiplied by a third phase deflection value or 0, and $M=L_{padding}$.

In a possible implementation, the first rule employed is bit-reversed reordering. For the $L_{padding}$ positions for a total of $L_{padding}$ values, namely, 0, 1, . . . , $L_{padding}-1$, are translated to m-digit binary numbers, respectively. For each binary representation, the corresponding m digits are reordered from low to high. If the original leftmost digit is high, the rightmost digit is high after bit reversal, and another binary representation thereof is obtained in order from right to left. The reordered $L_{padding}$ values are translated to decimal numbers plus 1, which are the positions of the elements in the RM sequence that require interpolation. Specifically, m=6,L=72 (6RB) is taken as an example for description. The RM sequence length to be matched $L_{padding}=72-2^6=8$, and a total of eight values, namely, 0, 1, . . . , 7, are respectively translated to 6-digit binary numbers, namely, [000000, 000001,000010,000011,000100,000101,000110,000111]. The binary numbers after bit-reversed reordering are [000000, 100000, 010000, 110000, 001000, 101000, 011000, 111000]. The eight reordered binary numbers are translated to decimal numbers plus 1, that is, [1, 33, 17, 49, 9, 41, 25, 57], sorted from smallest to largest as [1, 9, 17, 25, 33, 41, 49, 57], which are the positions of the elements in the RM sequence that require interpolation. Such a method for selecting the interpolation positions in the RM sequence includes, but is not limited to, the above method. If the value of the element at the adjacent position of the inserted element is $r_j$, j=1, 2, . . . , $2^m$, the value of the inserted element is $r_j*e^{i*\varphi}$, where $0\le\varphi\le 2\pi$. In particular, when $\varphi=0$, the value of the inserted element is the same as the value of the element at its adjacent position, that is, $r_j$; and when $\varphi=\pi$, the value of the inserted element is opposite to the value of the element at its adjacent position, that is, $-r_j$.

In another possible implementation, for the $L_{padding}$ positions selected according to the first rule, the value of the element inserted at the corresponding position of the RM sequence may also be 0. In this case, the RM sequence may be multiplied by a power boosting factor $\rho$. When $\rho=1$, no power boosting is performed; and when $$\rho=\sqrt{\frac{L}{2^m}},$$

power is boosted to be the same power as a transmitted uplink data portion.

It should be noted that, for the case that the value of the inserted element at the element insertion position selected according to the first rule is the value of the element at its adjacent position multiplied by the third phase deflection value or 0, after receiving the padded RM sequence, the network device performs the same operations as those in Embodiment 1, and details are not described herein again.

Figure 7:
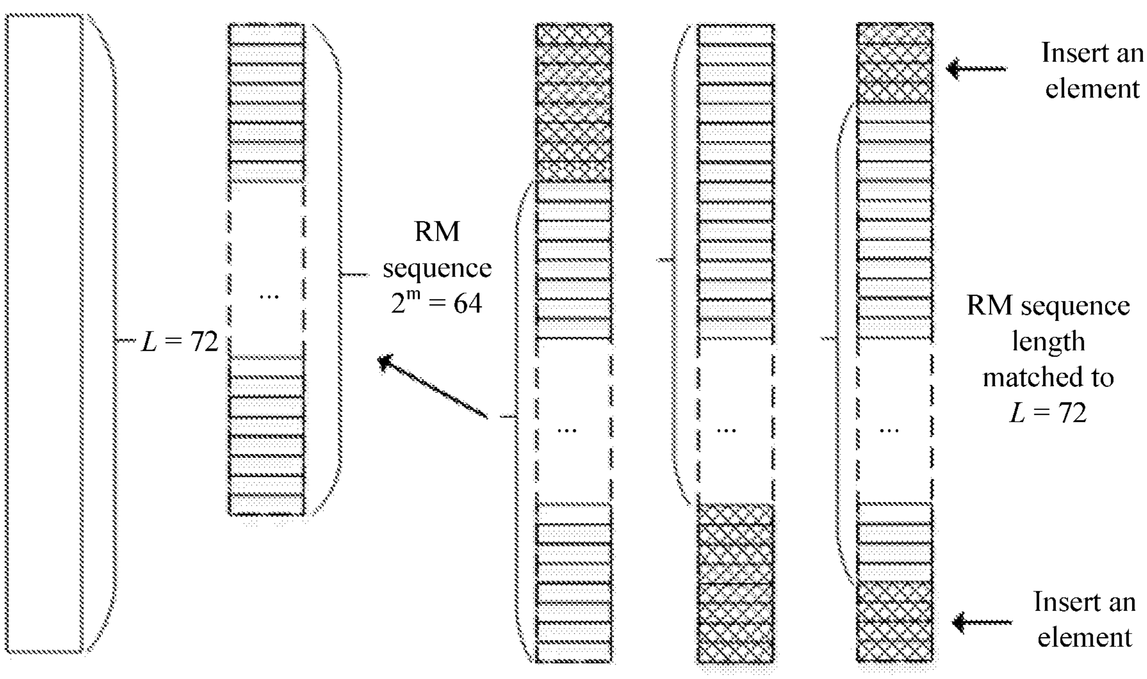
FIG. 7 is a schematic diagram of inserting elements outside an RM sequence according to an embodiment of this application.

Embodiment 4: Inserting Elements Outside an RM Sequence to Pad the RM Sequence (as Shown in FIG. 7)

First, an order m of a binary symmetric matrix for generating the RM sequence is determined. A specific determining method is the same as that in Embodiment 1, and details are not described herein again.

Then, for the reference signal length or codebook sequence length L, an RM sequence length to be matched (that is, a first sequence length to be matched) is denoted as $L_{padding}=L-2^m$. A starting point is selected within the range of the reference signal length to insert the RM sequence, and N elements are inserted at the remaining positions to pad the RM sequence length to L, where N is a quantity of the remaining positions. A value of the inserted element may be each of values of the N elements in the RM sequence from the selected starting point multiplied by a fourth phase deflection value, or may be 0.

In a possible implementation, a method for selecting the insertion positions of the RM sequence within the reference signal length is as follows:

A starting frequency domain resource position of the reference signal is selected as the starting point to place the entire RM sequence, and values of elements are inserted at the remaining $L_{padding}$ REs of a frequency domain resource of the reference signal to pad the RM sequence length to L. The values of the elements of the RM sequence are denoted as $r=[r_1, r_2, \ldots r_{2^m}]$. The values of the inserted elements may be values of $L_{padding}$ elements of the RM sequence up from the end of the sequence multiplied by the fourth phase deflection value, that is, $$\left[r_{2^m-L_{padding}+1}*e^{i*\varphi}, \ldots, r_{2^m}*e^{i*\varphi}\right],$$

where $0\le\varphi\le 2\pi$. When $\varphi=0$, the values of the inserted elements are the same as those of the elements of the original RM sequence, that is, $$\left[r_{2^m-L_{padding}+1}*e^{i*\varphi}, \ldots, r_{2^m}\right].$$

When $\varphi=\pi$, the values of the inserted elements are opposite to those of the elements of the original RM sequence, that is, $$\left[-r_{2^m-L_{padding}+1}*e^{i*\varphi}, \ldots, -r_{2^m}\right].$$

The starting frequency domain resource position of the reference signal that is offset by $$\frac{L_{padding}}{2}$$

positions is selected as the starting point. That is, the entire RM sequence is placed from position $$\frac{L_{padding}}{2}+1$$

and values of elements are inserted at the remaining $L_{padding}$ REs of a resource of the reference signal to pad the RM sequence length to L. The values of the elements of the RM sequence are denoted as $r=[r_1, r_2, \ldots, r_{2^m}]$. Values of the inserted elements at the starting frequency domain resource position of the reference signal to the position $$\frac{L_{padding}}{2}$$

are $$\left[r_1*e^{i*\varphi}, \ldots, r_{\frac{L_{padding}}{2}}*e^{i*\varphi}\right],$$

and values of the inserted elements at the remaining $$\frac{L_{padding}}{2}$$

positions are $$\left[r_{2^m-\frac{L_{padding}}{2}+1}*e^{i\varphi}, \ldots, r_{2^m}*e^{i*\varphi}\right].$$

The starting frequency domain resource position of the reference signal that is offset by $L_{padding}$ positions is selected. That is, the entire RM sequence is placed from position $L_{padding}+1$, and values of elements are inserted at the remaining $L_{padding}$ REs of the reference signal to pad the RM sequence length to L. The values of the elements of the RM sequence are denoted as $r=[r_1, r_2, \ldots, r_{2^m}]$, and values of the inserted elements at the starting frequency domain resource position of the reference signal to the position $L_{padding}$ are $$\left[r_1 * e^{i*\varphi}, \ldots , r_{L_{padding}} * e^{i*\varphi}\right].$$

It should be noted that, for the determined $L_{padding}$ interpolation positions, the values of the elements may also be inserted in a cyclic extension manner. To be specific, if an element needs to be inserted at position j (an absolute position index in a bandwidth resource of the reference signal), a corresponding inserted value is $f(j)=r(1+(j-1) \bmod 2^m)*e^{i*\varphi}$, where $r=[r_1, r_2, \ldots, r_{2^m}]$ are the values of the elements of the RM sequence.

In another possible implementation, values of the inserted elements at the determined $L_{padding}$ interpolation positions may also be 0. In this case, the RM sequence may be multiplied by a power boosting factor ρ. When ρ=1, no power boosting is performed; and when $$\rho = \sqrt{\frac{L}{2^m}},$$

power is boosted to be the same power as a transmitted uplink data portion.

It should be noted that after receiving the padded RM sequence, the network device needs to despread the element at the interpolation position, and then combine the despread element with the element at the corresponding position of the RM sequence. For the specific despreading and combination method, refer to Embodiment 1, and details are not described herein again. For the case that the value of the inserted element is 0, after receiving the padded RM sequence, the network device extracts elements at positions of the original RM sequence to obtain another signal of which a length is the RM sequence length $2^m$. A detection algorithm corresponding to structural characteristics of the RM sequence is utilized for processing. A conventional detection algorithm, such as a method based on a related operation on a received signal and a local sequence, may also be used for processing. An enhanced detection algorithm, such as a sparse recovery detection algorithm based on compressed sensing, may also be used for processing. In embodiments of this application, the above detection algorithms are not specifically limited.

The four methods, provided in Embodiment 1 to Embodiment 4, for padding the RM sequence to match the RM sequence length to the reference signal length can effectively resolve the problem that the RM sequence length is limited and does not match the reference signal length, improving robustness of frequency-selective channel detection performance.

2. Truncating the RM Sequence to Match the RM Sequence Length to the Reference Signal Length.

When the RM sequence length is greater than the reference signal length, an RM sequence length to be truncated (that is, a first sequence length to be truncated) is first determined as a difference between the RM sequence length and the reference signal length. Then, the RM sequence is truncated based on the RM sequence length to be truncated, so that the RM sequence length is the reference signal length.

In embodiments of this application, there are four cases for matching the RM sequence length by truncating the RM sequence, and the four cases are described below.

Embodiment 5: Uniformly Selecting Truncation Positions within an RM Sequence

First, an order m of a binary symmetric matrix for generating the RM sequence is determined. A specific method for determining the order m is the same as that in Embodiment 1, and details are not described herein again. The determined order m allows for an RM sequence length to be a value $2^m$ that is greater than and closest to a reference signal length L.

Then, for the reference signal length or codebook sequence length L, an RM sequence length to be truncated (that is, a first sequence length to be truncated) is denoted as $L_{punch}=2^m-L$, and values of $L_{punch}$ elements need to be deleted from the RM sequence to truncate the RM sequence to the length L. Specifically, a gap for uniformly truncating the RM sequence is $$L_{gap} = \left\lfloor \frac{2^m}{L_{punch}} \right\rfloor,$$

where $\lfloor \bullet \rfloor$ is a rounding-down operation. A manner of determining positions of the deleted elements is the same as that of determining the positions of the inserted elements in Embodiment 1, and details are not described herein again. Finally, the values of the $L_{punch}$ elements are deleted from the RM sequence to truncate the RM sequence to the length L.

Embodiment 6: Segmenting an RM Sequence, and Selecting Some Sections to Delete Elements First, an order m of a binary symmetric matrix for generating the RM sequence is determined. A specific determining method is the same as that in Embodiment 1, and details are not described herein again.

Then, for a reference signal length or codebook sequence length within the range of $2^m<L<2^{m+1}$, the same segmentation method may be employed, and elements are uniformly deleted from the selected sections to match the RM sequence length to the reference signal length L. Specifically, an RM sequence length to be matched and truncated (that is, a first sequence length to be truncated) is denoted as $L_{punch}=2^m-L$. In this embodiment of this application, the number of configurable sequence lengths within the range of $2^m<L<2^{m+1}$ is n, and the sequence lengths are $L_1, L_2, \ldots, L_n$, respectively. RM sequence lengths to be matched and truncated (that is, first sequence lengths to be truncated RM sequence lengths to be truncated) for the sequences relative to the RM sequence are $L_{punch,1}, L_{punch,2}, \ldots, L_{punch,n}$. The greatest common divisor of all the RM sequence lengths to be matched and truncated is taken and denoted as $L_{gcd}$. The RM sequence is uniformly divided into $L_{section}$ sections of length $L_{gcd}$, where $$L_{section} = \frac{2^m}{L_{gcd}}.$$

Then, $$\frac{L_{punch,i}}{L_{gcd}}$$

sections need to be selected from the $L_{section}$ sections of the RM sequence for uniform deletion of values of the elements. In this embodiment of this application, a method for selecting the sections with elements to be deleted includes, but is not limited to, selecting, from front to back, $$\frac{L_{punch,i}}{L_{gcd}}$$

sections starting from the first section. The $$\frac{L_{punch,i}}{L_{gcd}}$$

sections may also be selected, from back to front, starting from the last section. A method of first selecting the first and last sections and then expanding to the middle may also be employed. For the selected field sections with elements to be deleted, a method of comb-like uniform deletion of the elements at the selected positions or a method of continuously selecting the deletion positions is employed, and finally, the values of the $L_{punch}$ elements are deleted from the RM sequence to truncate the RM sequence to the length L.

Embodiment 7: Selecting Positions in an RM Sequence at which Elements are to be Deleted According to a Second Rule and Deleting the Elements to Truncate the RM Sequence First, an order m of a binary symmetric matrix for generating the RM sequence is determined. A specific determining method is the same as that in Embodiment 1, and details are not described herein again.

Then, for the reference signal length or codebook sequence length L, an RM sequence length to be truncated (that is, a first sequence length to be truncated) is denoted as $L_{punch}=2^m-L$, and within the range of the RM sequence length, $L_{punch}$ positions are selected according to the second rule to delete elements and truncate the RM sequence to the length L.

In a possible implementation, the second rule employed is bit-reversed reordering. For the $L_{punch}$ positions with elements to be deleted, a total of $L_{punch}$ values, namely, 0, 1, . . . , $L_{punch}-1$, are translated to m-digit binary numbers, respectively. For each binary representation, the corresponding m digits are reordered from low to high. If the original leftmost digit is high, the rightmost digit is high after bit reversal, and another binary representation thereof is written in order from right to left. The reordered $L_{punch}$ values are translated to decimal numbers plus 1, which are the positions in the RM sequence with the elements to be deleted. A method for non-uniformly selecting the deletion positions in the RM sequence according to the second rule includes, but is not limited to, the above method.

Embodiment 8: Within an RM Sequence, Selecting a Starting Position for Truncation According to a Third Rule, and Sequentially Taking a Continuous Sequence First, an order m of a binary symmetric matrix for generating the RM sequence is determined. A specific method for determining the order m is the same as that in Embodiment 1, and details are not described herein again. The determined order m allows for an RM sequence length to be a value $2^m$ that is greater than and closest to a reference signal length L.

Then, for the reference signal length or codebook sequence length L, an RM sequence length to be truncated (that is, a first sequence length to be truncated) is denoted as $L_{punch}=2^m-L$, and values of $L_{punch}$ elements need to be deleted from the RM sequence to truncate the RM sequence to the length L. Specifically, the first element to element $L_{punch}$ in the RM sequence from front to back are deleted, and the remaining sequence of length L is used as a reference signal. Alternatively, the last element to element L+1 in the RM sequence from back to front may be deleted, and the remaining sequence of length L is used as the reference signal. Determining the starting position in the RM sequence for truncation includes, but is not limited to, the above two solutions.

It should be noted that, after receiving the truncated RM sequence, the network device may pad elements at truncation positions, for example, pad zeros or values of elements at adjacent positions to obtain another signal of which a length is the RM sequence length $2^m$. A detection algorithm corresponding to structural characteristics of the RM sequence is utilized for processing. For example, the detection algorithm is an RM fast detection algorithm. A conventional detection algorithm, such as a method based on a related operation on a received signal and a local sequence, may also be used for processing. An enhanced detection algorithm, such as a sparse recovery detection algorithm based on compressed sensing, may also be used for processing. In embodiments of this application, the above detection algorithms are not specifically limited. If the RM fast detection algorithm does not perform the truncation position padding operation on the actually received truncated RM sequence, a detection algorithm corresponding to structural characteristics of the RM sequence may also be utilized for processing, a conventional detection algorithm, such as a method based on a related operation on a received signal and a local sequence, may also be used for processing, or an enhanced detection algorithm, such as a sparse recovery detection algorithm based on compressed sensing, may also be used for processing. In embodiments of this application, the above detection algorithms are not specifically limited.

The four methods, provided in Embodiment 5 to Embodiment 8, for truncating the RM sequence to match the RM sequence length to the reference signal length can effectively resolve the problem that the RM sequence length is limited and does not match the reference signal length, improving robustness of frequency-selective channel detection performance.

3. Based on the Determining Threshold, Determining to Pad and/or Truncate the RM Sequence for Length Matching In this embodiment of this application, an extension method based on padding or truncation may be flexibly selected by determining a determining threshold, to perform length matching for the RM sequence. This is described in detail below.

Embodiment 9

First, an order m of a binary symmetric matrix for generating the RM sequence is determined. A specific method for determining the order m is the same as that in Embodiment 1. It is determined based on the order m that the RM sequence includes two second-order RM sequences, namely, a short RM sequence and/or a long RM sequence, where a length $L_{short}$ of the short RM sequence is a value $2^m$ that is not greater than and closest to L, and a length $L_{long}$ of the long RM sequence is a value $2^{m+1}$ that is greater than and closest to L.

Then, for the reference signal length or codebook sequence length L, a difference between the reference signal length and the short RM sequence length is denoted as a second length to be matched, that is, $L_{short\text{-}gap}=L-L_{short}$, and a difference between the long RM sequence length and the reference signal length is denoted as a third length to be matched, that is, $L_{long\text{-}gap}=L_{long}-L$. For the reference signal length within the range of $L_{short}<L<L_{long}$, an extension method based on padding or truncation may be determined by comparing the values of $L_{short\text{-}gap}$ and $L_{long\text{-}gap}$, to perform the length matching. A ratio of $L_{short\text{-}gap}$ to $L_{long\text{-}gap}$ is denoted as $$\gamma=\frac{L_{short-gap}}{L_{long-gap}}.$$

The determining threshold is set to be $\nu_{threshold}$. In embodiments of this application, the determining threshold may be configured by the network device, or may be specified by a protocol, which is not specifically limited. In this case, the determining threshold is a first determining threshold. In this embodiment of this application, how to select an extension method of padding and/or truncation is described by taking $\nu_{threshold}=1$ as an example. This is described in detail below.

Specifically, for $\gamma=\nu_{threshold}$, that is, $L_{short\text{-}gap}=L_{long\text{-}gap}$, both the length matching methods, namely, padding the short RM sequence or truncating the long RM sequence, are acceptable, and the extension method of padding is preferred for length matching. For $\gamma<\nu_{threshold}$, that is, $L_{short\text{-}gap}<L_{long\text{-}gap}$, the extension method of padding is used for length matching; that is, the short RM sequence is padded. For $\gamma>\nu_{threshold}$, that is, $L_{short\text{-}gap}>L_{long\text{-}gap}$ the extension method of truncation is used for length matching; that is, the long RM sequence is truncated. The specific extension method of padding is the same as that in Embodiment 1 to Embodiment 4, and the specific extension method of truncation is the same as that in Embodiment 5 to Embodiment 8. Details are not described herein again.

In another possible implementation, for the reference signal length or codebook sequence length within the range of $L_{short}<L<L_{long}$, an extension method based on padding or truncation may also be determined by comparing $L_{short\text{-}gap}$ with L or comparing $L_{long\text{-}gap}$ with L, to perform the length matching. Calculating a ratio $$L_{ratio}=\frac{L_{short-gap}}{L}$$

of $L_{short\text{-}gap}$ to L is taken as an example for description. The determining threshold is set to be $\nu_{threshold}$ (in this case, the determining threshold is a second determining threshold), and how to select the length matching method is described by taking $$\nu_{threshold}=\frac{1}{3}$$

as an example. If ratio threshold, that is, $$L_{short-gap}<\frac{1}{3}L,$$

the extension method of padding is used, that is, the short RM sequence is padded. If $L_{ratio}>\nu_{threshold}$, that is $$L_{short-gap}>\frac{1}{3}L,$$

the extension method of truncation is used, that is, the long RM sequence is truncated. If $L_{ratio}=\nu_{threshold}$, that is, $$L_{short-gap}=\frac{1}{3}L,$$

both the extension methods are acceptable, and the extension method of padding is preferred. Similarly, calculating a ratio $$L_{ratio}=\frac{L_{long-gap}}{L}$$

of $L_{long\text{-}gap}$ to L is taken as an example for description. The determining threshold is set to be $\nu_{threshold}$ (in this case, the determining threshold is a third determining threshold), and how to select the length matching method is described by taking $$\nu_{threshold}=\frac{1}{3}$$

as an example. If $L_{ratio}<\nu_{threshold}$, that is, $$L_{long-gap}<\frac{1}{3}L,$$

the extension method of truncation is used, that is, the long RM sequence is truncated. If $L_{ratio}>\nu_{threshold}$, that is, $$L_{long-gap}>\frac{1}{3}L,$$

the extension method of padding is used, that is, the short RM sequence is padded. If $L_{ratio}=\nu_{threshold}$, that is, $$L_{long-gap}=\frac{1}{3}L,$$

either of the two extension methods may be used, and the extension method of padding is preferred. Similarly, a comparison may be made between $L_{short\text{-}gap}$ and $L_{short}$; that is, a ratio of $L_{short\text{-}gap}$ to $L_{short}$ is compared with a fourth determining threshold. If the ratio of $L_{short\text{-}gap}$ to $L_{short}$ is equal to the fourth determining threshold, the short RM sequence is padded, or the long RM sequence is truncated.

Alternatively, if the ratio of $L_{short\text{-}gap}$ to $L_{short}$ is less than the fourth determining threshold, the short RM sequence is padded. Alternatively, if the ratio of $L_{short\text{-}gap}$ to $L_{short}$ is greater than the fourth determining threshold, the long RM sequence is truncated. Alternatively, comparison may be made between $L_{long\text{-}gap}$ and $L_{long}$; that is, a ratio of $L_{long\text{-}gap}$ to $L_{long}$ is compared with a fifth determining threshold. If the ratio of $L_{long\text{-}gap}$ to $L_{long}$ is equal to the fifth determining threshold, the short RM sequence is padded, or the long RM sequence is truncated. Alternatively, if the ratio of $L_{long\text{-}gap}$ to $L_{long}$ is greater than the fifth determining threshold, the short RM sequence is padded. Alternatively, if the ratio of $L_{long\text{-}gap}$ to $L_{long}$ is less than the fifth determining threshold, the long RM sequence is truncated. The padding method in Embodiment 9 is the same as the specific solution in Embodiment 1 to Embodiment 4, and the truncation method is the same as the specific solution in Embodiment 5 to Embodiment 8. Details are not described herein again.

It should be noted that, if the extension method of padding is employed, after the network device receives the padded RM sequence, the operations on the RM sequence are the same as those in Embodiment 1 to Embodiment 4; and if the extension method of truncation is employed, after the network device receives the truncated RM sequence, the operations on the RM sequence are the same as those in Embodiment 5 to Embodiment 8.

According to the technical solution described in Embodiment 9, based on the determining threshold, the terminal flexibly determines to use the extension method of padding or truncation for length matching by using the reference signal length and the short RM sequence length and/or the long RM sequence length, which can effectively resolve the problem that the RM sequence length is limited and does not match the reference signal length, improving robustness of frequency-selective channel detection performance.

Figure 8:
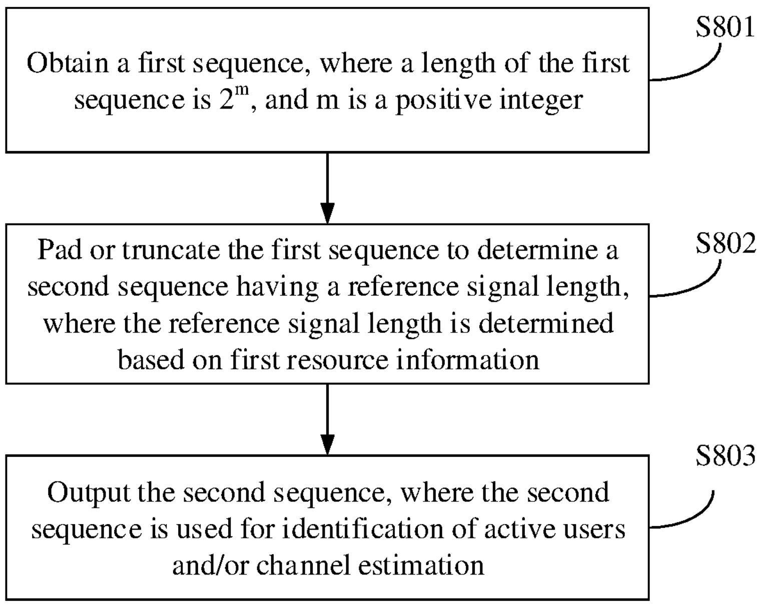
FIG. 8 is a schematic flowchart of a wireless communication method according to an embodiment of this application.

An embodiment of this application provides a schematic flowchart of a wireless communication method, as shown in FIG. 8. In this embodiment of this application, the wireless communication method is applied to a terminal side. The schematic flowchart includes S801 to S803, which are specifically as follows.

S801: Obtain a first sequence, where a length of the first sequence is $2^m$, and m is a positive integer.

The terminal first obtains the first sequence of length $2^m$, where m is a positive integer.

In a possible implementation, the first sequence is a Reed-Muller sequence, where the Reed-Muller sequence is determined based on a binary symmetric matrix with order m and a binary vector.

Then, in S802, the first sequence is padded or truncated to determine a second sequence having a reference signal length, where the reference signal length is determined based on first resource information.

In this embodiment of this application, the second sequence having the reference signal length is obtained by padding or truncating the first sequence. The reference signal length is determined based on the first resource information. In a possible implementation, the first resource information may be the number of resource blocks, or may be a resource element, or may be reference signal pattern indication information.

In a possible implementation, it is determined to pad or truncate the first sequence based on the first sequence length, the reference signal length, and a determining threshold.

A method for padding the first sequence includes: determining that a first sequence length to be matched is a difference between the reference signal length and the first sequence length; and inserting elements into the first sequence based on the first sequence length to be matched, so that the first sequence length is the reference signal length. Specifically, the elements may be inserted into the first sequence based on the first sequence length to be matched, by using one of the following three methods.

The first method is determining a uniform insertion gap based on a ratio of the first sequence length to the first sequence length to be matched; and inserting one element every uniform insertion gap, where a value of the inserted element includes a value of an element at its adjacent position multiplied by a first phase deflection value or 0.

The second method is dividing the first sequence into $L_{section}$ sections of which a length is a preset threshold, where $L_{section}$ is a ratio of the first sequence length to the preset threshold; and selecting M sections from the $L_{section}$ sections to insert elements, where M is a rounded-up ratio of the first sequence length to be matched to the preset threshold, and a value of the inserted element includes a value of an element at its adjacent position multiplied by a second phase deflection value or 0.

The third method is selecting, according to a first rule, M positions in the first sequence to insert elements, so that the first sequence length is the reference signal length, where a value of the inserted element includes a value of an element at its adjacent position multiplied by a third phase deflection value or 0, and M is equal to the first sequence length to be matched.

In a possible implementation, the determining to pad the first sequence based on the first sequence length, the reference signal length, and a determining threshold may be selecting a starting point in a reference signal to insert the first sequence; and inserting N elements at remaining positions in the reference signal, where a value of the inserted element includes each of values of the N elements in the first sequence from the selected starting point multiplied by a fourth phase deflection value or 0, and N is equal to a quantity of the remaining positions.

In a possible implementation, the first sequence includes a short first sequence and/or a long first sequence, where a length $L_{short}$ of the short first sequence is a value $2^m$ that is not greater than and closest to the reference signal length L, and a length $L_{long}$ of the long first sequence is a value $2^{m+1}$ that is greater than and closest to the reference signal length L. Correspondingly, the padding or truncating the first sequence may be determining a first sequence second length to be matched as $L_{short\text{-}gap}=L-L_{short}$ and/or a first sequence third length to be matched as $L_{long\text{-}gap}=L_{long}-L$; comparing a ratio of $L_{short\text{-}gap}$ to $L_{long\text{-}gap}$ with a first determining threshold, and determining to pad or truncate the first sequence based on a first comparison result; specifically, if the ratio of $L_{short\text{-}gap}$ to $L_{long\text{-}gap}$ is equal to the first determining threshold, padding the short first sequence or truncating the long first sequence; or if the ratio of $L_{short\text{-}gap}$ to $L_{long\text{-}gap}$ is less than the first determining threshold, padding the short first sequence; or if the ratio of $L_{short\text{-}gap}$ to $L_{long\text{-}gap}$ is greater than the first determining threshold, truncating the long first sequence; or comparing a ratio of $L_{short\text{-}gap}$ to L with a second determining threshold, and determining to pad or truncate the first sequence based on a second comparison result; specifically, if the ratio of $L_{short\text{-}gap}$ to L is equal to the second determining threshold, padding the short first sequence or truncating the long first sequence; or if the ratio of $L_{short\text{-}gap}$ to L is less than the second determining threshold, padding the short first sequence; or if the ratio of $L_{short\text{-}gap}$ to L is greater than the second determining threshold, truncating the long first sequence; or comparing a ratio of $L_{long\text{-}gap}$ to L with a third determining threshold, and determining to pad or truncate the first sequence based on a third comparison result; specifically, if the ratio of $L_{long\text{-}gap}$ to L is equal to the third determining threshold, padding the short first sequence or truncating the long first sequence; or if the ratio of $L_{long\text{-}gap}$ to L is greater than the third determining threshold, padding the short first sequence; or if the ratio of $L_{long\text{-}gap}$ to L is less than the third determining threshold, truncating the long first sequence; or comparing a ratio of $L_{short\text{-}gap}$ to $L_{short}$ with a fourth determining threshold, and determining to pad or truncate the first sequence based on a fourth comparison result; specifically, if the ratio of $L_{short\text{-}gap}$ to $L_{short}$ is equal to the fourth determining threshold, padding the short first sequence or truncating the long first sequence; or if the ratio of $L_{short\text{-}gap}$ to $L_{short}$ is less than the fourth determining threshold, padding the short first sequence; or if the ratio of $L_{short\text{-}gap}$ to $L_{short}$ is greater than the fourth determining threshold, truncating the long first sequence; or comparing a ratio of $L_{long\text{-}gap}$ to $L_{long}$ with a fifth determining threshold, and determining to pad or truncate the first sequence based on a fifth comparison result; specifically, if the ratio of $L_{long\text{-}gap}$ to $L_{long}$ is equal to the fifth determining threshold, padding the short first sequence or truncating the long first sequence; or if the ratio of $L_{long\text{-}gap}$ to $L_{long}$ is greater than the fifth determining threshold, padding the short first sequence; or if the ratio of $L_{long\text{-}gap}$ to $L_{long}$ is less than the fifth determining threshold, truncating the long first sequence.

S803: Output the second sequence, where the second sequence is used for identification of active users and/or channel estimation.

In this embodiment of this application, the terminal outputs the second sequence for identification of active users and/or channel estimation.

In a possible implementation, the second sequence is a reference signal generated based on the RM sequence.

Figure 9:
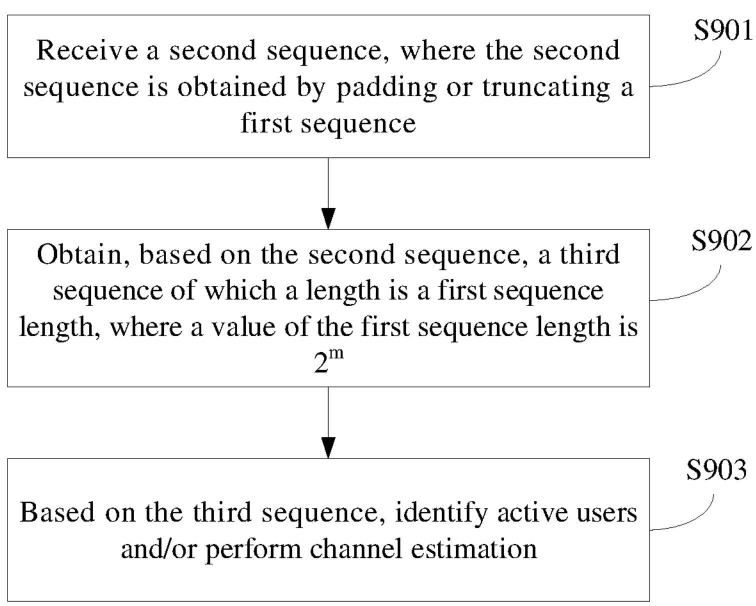
FIG. 9 is a schematic flowchart of another wireless communication method according to an embodiment of this application.

An embodiment of this application provides a schematic flowchart of a wireless communication method, as shown in FIG. 9. In this embodiment of this application, the wireless communication method is applied to a network device side. The schematic flowchart includes: S901 to S903, which are specifically as follows.

S901: Receive a second sequence, where the second sequence is obtained by padding or truncating a first sequence.

The network device receives the second sequence output by a terminal.

S902: Obtain, based on the second sequence, a third sequence of which a length is a first sequence length, where a value of the first sequence length is $2^m$.

In this embodiment of this application, the third sequence of which the length is the first sequence length $2^m$ is obtained based on the second sequence. In a possible implementation, the second sequence is despread and combined based on positions for padding or truncating the first sequence, to obtain the third sequence of which the length is the first sequence length, ensuring robust detection performance. Specifically, if a value of an element for padding the first sequence is a value of an element at its adjacent position multiplied by a first, second, or third phase deflection value, the element at the padding position in the second sequence is despread, and then the despread element at the padding position is combined with the element at its adjacent position; or if a value of an element for padding the first sequence is each of values, multiplied by a fourth phase deflection value, of N elements in the first sequence inserted from a starting point selected from a reference signal, the element at the padding position in the second sequence is despread, and then the despread element at the padding position is combined with the inserted N elements in the first sequence, where N is a difference between a reference signal length and the first sequence length; or if the value of the element for padding the first sequence is 0, the first sequence is extracted from the second sequence; or if the first sequence is truncated, an element is padded at a truncation position.

S903: Based on the third sequence, identify active users and/or perform channel estimation.

In a possible implementation, in S802, the terminal obtains the second sequence (that is, the reference signal) having the reference signal length by padding or truncating the first sequence. In S803, the terminal sends the second sequence to the network device. In S902, the network device recovers the third sequence of which the length is the first sequence length $2^m$ by despreading and combining the second sequence having the reference signal length. Based on the third sequence, active users are identified, and/or channel estimation is performed.

In order to implement the various functions in the methods provided in the foregoing embodiments of this application, the terminal and the network device may include a hardware structure and/or a software module. The foregoing various functions are implemented in the form of a hardware structure, a software module, or a hardware structure plus a software module. Whether one of the foregoing functions is performed in the manner of a hardware structure, a software module, or a hardware structure and a software module depends on a specific application and design constraints of the technical solutions.

Based on the same technical concept, an embodiment of this application further provides the following communication apparatus, which may include modules or units corresponding on a one-to-one basis to execution of the methods/operations/steps/actions of the terminal or the network device in the foregoing method embodiments. The unit may be a hardware circuit, or may be software, or may be implemented by combining a hardware circuit with software.

Figure 10:
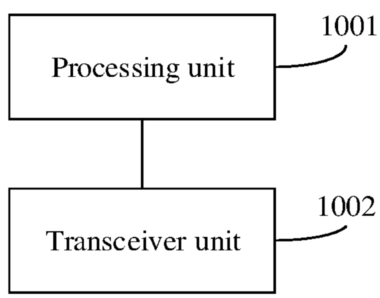
FIG. 10 is a schematic diagram of a structure of a wireless communication apparatus according to an embodiment of this application.

FIG. 10 is a schematic diagram of a structure of a wireless communication apparatus according to an embodiment of this application. The schematic diagram of the structure includes a processing unit 1001, configured to obtain a first sequence, where a value of a length of the first sequence is $2^m$; and the processing unit 1001 is further configured to pad or truncate the first sequence to determine a second sequence having a reference signal length, where the reference signal length is determined based on first resource information; and a transceiver unit 1002, configured to output the second sequence, where the second sequence is used for identification of active users and/or channel estimation.

In a possible implementation, the first sequence is a Reed-Muller sequence, where the Reed-Muller sequence is determined based on a binary symmetric matrix with order m and a binary vector.

In a possible implementation, the first resource information includes: at least one of a number of resource blocks, a resource element, or reference signal pattern indication information.

In a possible implementation, the first sequence includes a short first sequence and/or a long first sequence, where a length $L_{short}$ of the short first sequence is a value $2^m$ that is not greater than and closest to the reference signal length L, and a length $L_{long}$ of the long first sequence is a value $2^{m+1}$ that is greater than and closest to the reference signal length L.

In a possible implementation, the processing unit 901 is specifically configured to determine to pad or truncate the first sequence based on the first sequence length, the reference signal length, and a determining threshold.

In a possible implementation, the padding the first sequence includes inserting elements into the first sequence based on a first sequence length to be matched, so that the first sequence length is the reference signal length, where the first sequence length to be matched is a difference between the reference signal length and the first sequence length.

In a possible implementation, the inserting elements into the first sequence based on a first sequence length to be matched includes determining a uniform insertion gap based on a ratio of the first sequence length to the first sequence length to be matched; and inserting one element every uniform insertion gap, where a value of the inserted element includes a value of an element at its adjacent position multiplied by a first phase deflection value or 0.

In a possible implementation, the inserting elements into the first sequence based on a first sequence length to be matched further includes dividing the first sequence into $L_{section}$ sections of which a length is a preset threshold, where $L_{section}$ is a ratio of the first sequence length to the preset threshold; and selecting M sections from the $L_{section}$ sections to insert elements, where M is a rounded-up ratio of the first sequence length to be matched to the preset threshold, and a value of the inserted element includes a value of an element at its adjacent position multiplied by a second phase deflection value or 0.

In a possible implementation, the inserting elements into the first sequence based on a first sequence length to be matched further includes selecting, according to a first rule, M positions in the first sequence to insert elements, so that the first sequence length is the reference signal length, where a value of the inserted element includes a value of an element at its adjacent position multiplied by a third phase deflection value or 0, and M is equal to the first sequence length to be matched.

In a possible implementation, the determining to pad the first sequence based on the first sequence length, the reference signal length, and a determining threshold includes selecting a starting point in a reference signal to insert the first sequence; and inserting N elements at remaining positions in the reference signal, where a value of the inserted element includes each of values of the N elements in the first sequence from the selected starting point multiplied by a fourth phase deflection value or 0, and N is equal to a quantity of the remaining positions.

In a possible implementation, the padding or truncating the first sequence includes: determining a first sequence second length to be matched as $L_{short\text{-}gap}=L-L_{short}$ and/or a first sequence third length to be matched as $L_{long\text{-}gap}=L_{long}-L$; comparing a ratio of $L_{short\text{-}gap}$ to $L_{long\text{-}gap}$ with a first determining threshold, and determining to pad or truncate the first sequence based on a first comparison result; or comparing a ratio of $L_{short\text{-}gap}$ to L with a second determining threshold, and determining to pad or truncate the first sequence based on a second comparison result; or comparing a ratio of $L_{long\text{-}gap}$ to L with a third determining threshold, and determining to pad or truncate the first sequence based on a third comparison result; or comparing a ratio of $L_{short\text{-}gap}$ to $L_{short}$ with a fourth determining threshold, and determining to pad or truncate the first sequence based on a fourth comparison result; or comparing a ratio of $L_{long\text{-}gap}$ to $L_{long}$ with a fifth determining threshold, and determining to pad or truncate the first sequence based on a fifth comparison result.

In a possible implementation, the determining to pad or truncate the first sequence based on a first comparison result includes if the ratio of $L_{short\text{-}gap}$ to $L_{long\text{-}gap}$ is equal to the first determining threshold, padding the short first sequence or truncating the long first sequence; or if the ratio of $L_{short\text{-}gap}$ to $L_{long\text{-}gap}$ is less than the first determining threshold, padding the short first sequence; or if the ratio of $L_{short\text{-}gap}$ to $L_{long\text{-}gap}$ is greater than the first determining threshold, truncating the long first sequence.

In a possible implementation, the determining to pad or truncate the first sequence based on a second comparison result includes if the ratio of $L_{short\text{-}gap}$ to L is equal to the second determining threshold, padding the short first sequence or truncating the long first sequence; or if the ratio of $L_{short\text{-}gap}$ to L is less than the second determining threshold, padding the short first sequence; or if the ratio of $L_{short\text{-}gap}$ to L is greater than the second determining threshold, truncating the long first sequence.

In a possible implementation, the determining to pad or truncate the first sequence based on a third comparison result includes, if the ratio of $L_{long\text{-}gap}$ to L is equal to the third determining threshold, padding the short first sequence or truncating the long first sequence; or if the ratio of $L_{long\text{-}gap}$ to L is greater than the third determining threshold, padding the short first sequence; or if the ratio of $L_{long\text{-}gap}$ to L is less than the third determining threshold, truncating the long first sequence.

In a possible implementation, the determining to pad or truncate the first sequence based on a fourth comparison result includes, if the ratio of $L_{short\text{-}gap}$ to $L_{short}$ is equal to the fourth determining threshold, padding the short first sequence or truncating the long first sequence; or if the ratio of $L_{short\text{-}gap}$ to $L_{short}$ is less than the fourth determining threshold, padding the short first sequence; or if the ratio of $L_{short\text{-}gap}$ to $L_{short}$ is greater than the fourth determining threshold, truncating the long first sequence.

In a possible implementation, the determining to pad or truncate the first sequence based on a fifth comparison result includes, if the ratio of $L_{long\text{-}gap}$ to $L_{long}$ is equal to the fifth determining threshold, padding the short first sequence or truncating the long first sequence; or if the ratio of $L_{long\text{-}gap}$ to $L_{long}$ is greater than the fifth determining threshold, padding the short first sequence; or if the ratio of $L_{long\text{-}gap}$ to $L_{long}$ is less than the fifth determining threshold, truncating the long first sequence.

Figure 11:
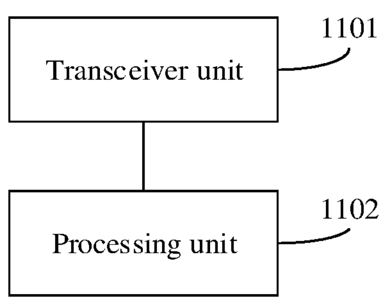
FIG. 11 is another schematic diagram of a structure of a wireless communication apparatus according to an embodiment of this application.

FIG. 11 is another schematic diagram of a structure of a wireless communication apparatus according to an embodiment of this application. The schematic diagram of the structure includes: a transceiver unit 1101, configured to receive a second sequence, where the second sequence is obtained by padding or truncating a first sequence; and a processing unit 1102, configured to obtain, based on the second sequence, a third sequence of which a length is a first sequence length, where a value of the first sequence length is $2^m$; and the processing unit 1102 is further configured to: based on the third sequence, identify active users and/or perform channel estimation.

In a possible implementation, the processing unit 1102 is specifically configured to despread and combine the second sequence based on positions for padding or truncating the first sequence, to obtain the third sequence of which the length is the first sequence length.

In a possible implementation, the despreading and combining the second sequence based on positions for padding or truncating the first sequence includes, if a value of an element for padding the first sequence is a value of an element at its adjacent position multiplied by a first, second, or third phase deflection value, despreading the element at the padding position in the second sequence, and then combining the despread element at the padding position with the element at its adjacent position; or if a value of an element for padding the first sequence is each of values, multiplied by a fourth phase deflection value, of N elements in the first sequence inserted from a starting point selected from a reference signal, despreading the element at the padding position in the second sequence, and then combining the despread element at the padding position with the inserted N elements in the first sequence, where N is a difference between a reference signal length and the first sequence length; or if the value of the element for padding the first sequence is 0, extracting the first sequence from the second sequence; or if the first sequence is truncated, padding an element at a truncation position.

An embodiment of this application further provides a wireless communication apparatus, including an input/output interface and a logic circuit, where the apparatus may be a chip. The input/output interface is configured to input or output a signal or data, and the logic circuit is configured to perform some or all steps of any method provided in embodiments of this application. For example, the input/output interface is configured to obtain a first sequence. The logic circuit is configured to perform S801, S802, and S803 in FIG. 8, to determine a second sequence based on the first sequence. The input/output interface is further configured to output the second sequence.

An embodiment of this application further provides a wireless communication apparatus, including an input/output interface and a logic circuit, where the apparatus may be a chip. The input/output interface is configured to input or output a signal or data, and the logic circuit is configured to perform some or all steps of any method provided in embodiments of this application. For example, the input/output interface is configured to obtain a second sequence. The logic circuit is configured to perform S901, S902, and S903 in FIG. 9, to determine a third sequence based on the second sequence, and based on the third sequence, identify active users and/or perform channel estimation.

Figure 12:
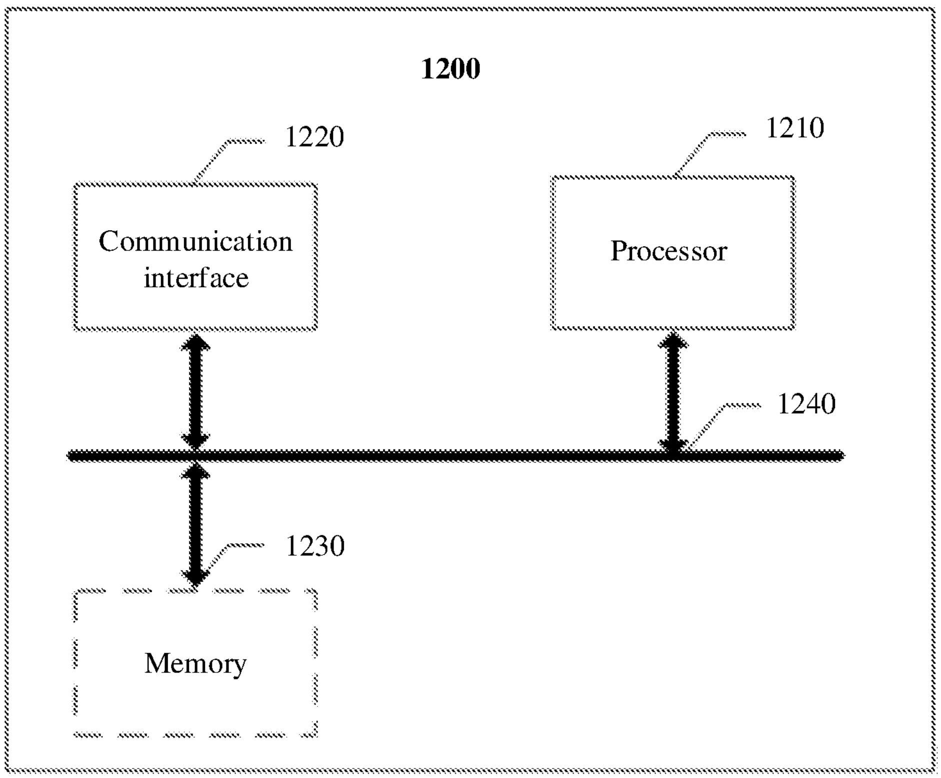
FIG. 12 is a schematic diagram of a structure of another wireless communication apparatus according to an embodiment of this application.

Referring to FIG. 12, an embodiment of this application further provides a communication apparatus 1200, to implement the functions of the terminal or the network device in the foregoing methods. The communication apparatus 1200 may be a chip system. In this embodiment of this application, the chip system may include a chip, or may include the chip and another discrete device. The communication apparatus 1200 includes at least one processor 1210, configured to implement the functions of the terminal and the network device in the methods provided in embodiments of this application. The communication apparatus 1200 may further include a communication interface 1220. In this embodiment of this application, the communication interface may be a transceiver, a circuit, a bus, a module, or another type of communication interface, and is configured to communicate with another device over a transmission medium. For example, the communication interface 1220 is configured for the apparatus in the communication apparatus 1200 to communicate with another device.

The processor 1210 may perform the functions performed by the processing unit 1210 in the communication apparatus 1200. The communication interface 1220 may be configured to perform the functions performed by the transceiver unit 1220 in the communication apparatus 1200.

When the communication apparatus 1200 is configured to perform a terminal method (such as the method shown in FIG. 8), the processor 1210 is configured to: obtain a first sequence, where a length of the first sequence is $2^m$, and m is a positive integer; pad or truncate the first sequence to determine a second sequence having a reference signal length, where the reference signal length is determined based on first resource information; and output the second sequence, where the second sequence is used for identification of active users and/or channel estimation.

When the communication apparatus 1200 is configured to perform a network device method (such as the method shown in FIG. 9), the communication interface 1220 is configured to: receive a second sequence, where the second sequence is obtained by padding or truncating a first sequence; obtain, based on the second sequence, a third sequence of which a length is a first sequence length, where a value of the first sequence length is $2^m$; and based on the third sequence, identify active users and/or perform channel estimation.

The communication interface 1220 is further configured to perform other receiving or sending steps or operations in the method of the terminal or the network device in the foregoing method embodiments. The processor 1210 may be further configured to perform the other corresponding steps or operations in the foregoing method embodiments than sending and receiving, and details are not described herein again.

The communication apparatus 1200 may further include at least one memory 1230, configured to store program instructions and/or data. The memory 1230 is coupled to the processor 1210. The coupling in this embodiment of this application is indirect coupling or a communication connection between apparatuses, units, or modules for information exchange between the apparatuses, the units, or the modules, and may be in electrical, mechanical, or other forms. The processor 1220 may cooperate with the memory 1230. The processor 1210 may execute the program instructions stored in memory 1230. In a possible implementation, at least one of the at least one memory may be integrated with the processor. In another possible implementation, the memory 1230 is separate from the communication apparatus 1200.

A specific connection medium between the communication interface 1220, the processor 1210, and the memory 1230 is not limited in this embodiment of this application. In this embodiment of this application, in FIG. 12, the memory 1230, the processor 1210, and the communication interface 1220 are connected through a bus 1240. The bus is represented by a bold line in FIG. 12, and a manner of connection between other components is merely for schematic illustration, which is not limited thereto. The bus may be classified into an address bus, a data bus, a control bus, and the like. For ease of representation, only one bold line is used for representation in FIG. 12, but this does not mean that there is only one bus or only one type of bus.

In this embodiment of this application, the processor 1210 may be a baseband processor. For example, at the terminal, the processor 1210 determines the second sequence having the reference signal length based on the first sequence by using any one of the possible implementations in the foregoing method embodiments, and outputs the second sequence for identification of active users and/or channel estimation by using the communication interface 1220 to a radio frequency circuit; and the radio frequency circuit performs radio frequency processing on the second sequence, and then transmits the radio frequency signal through an antenna in the form of electromagnetic waves.

For example, at the network device, the radio frequency circuit receives the radio frequency signal through the antenna, and converts the radio frequency signal into the second sequence; the communication interface 1220 obtains the second sequence; and the processor 1210 determines a third sequence having the first sequence length based on the second sequence by using any one of the possible implementations in the foregoing method embodiments.

It should be noted that the processor 1210 may be one or more central processing units (CPU), and when the processor 1210 is one CPU, the CPU may be a single-core CPU or a multi-core CPU. The processor 1210 may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in embodiments of the present application. The general-purpose processor may be a microprocessor, or may be any conventional processor or the like. The steps of the method disclosed with reference to embodiments of this application may be directly performed by a hardware processor, or may be performed by a combination of hardware and software modules in the processor.

In this embodiment of this application, the memory 1230 may include, but is not limited to, a non-volatile memory such as a hard disk drive (HDD) or a solid-state drive (SSD), or a random access memory (RAM), an erasable programmable read-only memory (Erasable Programmable ROM, EPROM), a read-only memory (ROM), a compact disc read-only memory (CD-ROM), or the like. The memory is any other medium that can carry or store expected program code in a form of an instruction structure or a data structure and that can be accessed by a computer, but is not limited thereto. The memory in embodiments of this application may alternatively be a circuit or any other apparatus that can implement a storage function, and is configured to store program instructions and/or data.

An embodiment of this application provides a computer-readable storage medium. The computer-readable storage medium stores a computer program, and when the computer program is executed by a processor, the steps of the wireless communication method corresponding to FIG. 8 are performed, or the steps of the wireless communication method corresponding to FIG. 9 are performed.

Based on the same concept as the foregoing method embodiments, an embodiment of this application further provides a computer program product including instructions. The computer program product, when running on a computer, causes the computer to perform some or all steps of any one of the methods in the foregoing aspects.

Based on the same concept as the foregoing method embodiments, this application further provides a chip or a chip system, where the chip may include a processor. The chip may further include a memory (or a storage module) and/or a transceiver (or a communication module), or the chip is coupled to the memory (or the storage module) and/or the transceiver (or the communication module). The transceiver (or the communication module) may be configured to support the chip for wired and/or wireless communication. The memory (or the storage module) may be configured to store a program. The processor can invoke the program to implement the operations performed by a transmit-end device or a receive-end device in any one of the foregoing method embodiments and the possible implementations thereof. The chip system may include the chip, or may include the chip and other discrete devices, such as the memory (or the storage module) and/or the transceiver (or the communication module).

Based on the same concept as the foregoing method embodiments, this application further provides a communication system, where the communication system may include the terminal and the network device. The communication system may be used to implement the operations performed by a transmit-end device or a receive-end device in any one of the foregoing method embodiments and the possible implementations thereof. For example, the communication system may have a structure shown in FIG. 3.

It should be noted that the foregoing embodiments are merely used to describe the technical solutions of this application, but are not intended to limit this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit or scope of the technical solutions of embodiments of this application.

What is claimed is:

1. A wireless communication method, comprising:

obtaining a first sequence, wherein a length of the first sequence is $2^m$, and m is a positive integer;

padding or truncating the first sequence to determine a second sequence having a reference signal length L, wherein the reference signal length is determined based on first resource information; and outputting the second sequence, wherein the second sequence identifies at least one of active users or channel estimation, wherein the first resource information comprises at least one of a number of resource blocks, a resource element, or reference signal pattern indication information, wherein the first sequence comprises at least one of a short first sequence or a long first sequence, wherein a length $L_{short}$ of the short first sequence is a value $2^m$ that is not greater than and closest to the reference signal length L, and wherein a length $L_{long}$ of the long first sequence is a value $2^{m+1}$ that is greater than and closest to the reference signal length L, and wherein padding or truncating the first sequence comprises:

determining at least one of a first sequence second length to be matched as $L_{short\text{-}gap}=L-L_{short}$ or a first sequence third length to be matched as $L_{long\text{-}gap}=L_{long}-L$; and performing at least one of:

comparing a ratio of $L_{short\text{-}gap}$ to $L_{long\text{-}gap}$ with a first determining threshold, and determining to pad or truncate the first sequence based on a first comparison result;

comparing a ratio of $L_{short\text{-}gap}$ to L with a second determining threshold, and determining to pad or truncate the first sequence based on a second comparison result;

comparing a ratio of $L_{long\text{-}gap}$ to L with a third determining threshold, and determining to pad or truncate the first sequence based on a third comparison result;

comparing a ratio of $L_{short\text{-}gap}$ to $L_{short}$ with a fourth determining threshold, and determining to pad or truncate the first sequence based on a fourth comparison result; or comparing a ratio of $L_{long\text{-}gap}$ to $L_{long}$ with a fifth determining threshold, and determining to pad or truncate the first sequence based on a fifth comparison result.

2. The method according to claim 1, wherein the first sequence is a Reed-Muller sequence, and the Reed-Muller sequence is determined based on a binary symmetric matrix with order m and a binary vector.

3. The method according to claim 1, wherein determining to pad or truncate the first sequence based on the first comparison result comprises at least one of:

based on the ratio of $L_{short\text{-}gap}$ to $L_{long\text{-}gap}$ being equal to the first determining threshold, L padding the short first sequence or truncating the long first sequence;

based on the ratio of $L_{short\text{-}gap}$ to $L_{long\text{-}gap}$ being less than the first determining threshold, padding the short first sequence; or based on the ratio of $L_{short\text{-}gap}$ to $L_{long\text{-}gap}$ being greater than the first determining threshold, truncating the long first sequence.

4. The method according to claim 1, wherein determining to pad or truncate the first sequence based on the second comparison result comprises at least one of:

based on the ratio of $L_{short\text{-}gap}$ to L being equal to the second determining threshold, padding the short first sequence or truncating the long first sequence;

based on the ratio of $L_{short\text{-}gap}$ to L being less than the second determining threshold, padding the short first sequence; or based on the ratio of $L_{short\text{-}gap}$ to L being greater than the second determining threshold, truncating the long first sequence.

5. The method according to claim 1, wherein determining to pad or truncate the first sequence based on the third comparison result comprises:

based on the ratio of $L_{long\text{-}gap}$ to L being equal to the third determining threshold, padding the short first sequence or truncating the long first sequence;

based on the ratio of $L_{long\text{-}gap}$ to L being greater than the third determining threshold, padding the short first sequence; or based on the ratio of $L_{long\text{-}gap}$ to L being less than the third determining threshold, truncating the long first sequence.

6. The method according to claim 1, wherein determining to pad or truncate the first sequence based on the fourth comparison result comprises:

based on the ratio of $L_{short\text{-}gap}$ to $L_{short}$ being equal to the fourth determining threshold, padding the short first sequence or truncating the long first sequence;

based on the ratio of $L_{short\text{-}gap}$ to $L_{short}$ being less than the fourth determining threshold, padding the short first sequence; or based on the ratio of $L_{short\text{-}gap}$ to $L_{short}$ being greater than the fourth determining threshold, truncating the long first sequence.

7. The method according to claim 1, wherein determining to pad or truncate the first sequence based on the fifth comparison result comprises:

based on the ratio of $L_{long\text{-}gap}$ to $L_{long}$ being equal to the fifth determining threshold, padding the short first sequence or truncating the long first sequence;

based on the ratio of $L_{long\text{-}gap}$ to $L_{long}$ being greater than the fifth determining threshold, padding the short first sequence; or based on the ratio of $L_{long\text{-}gap}$ to $L_{long}$ being less than the fifth determining threshold, truncating the long first sequence.

8. The method according to claim 1, wherein padding the first sequence comprises:

inserting elements into the first sequence based on a first sequence length to be matched, so that the first sequence length is the reference signal length, wherein the first sequence length to be matched is a difference between the reference signal length and the first sequence length.

9. The method according to claim 8, wherein inserting elements into the first sequence based on the first sequence length to be matched comprises:

determining a uniform insertion gap based on a ratio of the first sequence length to the first sequence length to be matched; and inserting one element every uniform insertion gap, wherein a value of the inserted element comprises a value of an element at its adjacent position multiplied by a first phase deflection value or 0.

10. The method according to claim 8, wherein inserting elements into the first sequence based on the first sequence length to be matched further comprises:

dividing the first sequence into $L_{section}$ sections of which a length is a preset threshold, wherein $L_{section}$ is a ratio of the first sequence length to the preset threshold; and selecting M sections from the $L_{section}$ sections to insert elements, wherein M is a rounded-up ratio of the first sequence length to be matched to the preset threshold, and a value of the inserted element comprises a value of an element at its adjacent position multiplied by a second phase deflection value or 0.

11. The method according to claim 8, wherein inserting elements into the first sequence based on the first sequence length to be matched further comprises:

selecting, according to a first rule, M positions in the first sequence to insert elements, wherein the first sequence length is the reference signal length, wherein a value of the inserted element comprises a value of an element at its adjacent position multiplied by a third phase deflection value or 0, and wherein M is equal to the first sequence length to be matched.

12. The method according to claim 1, wherein the determining to pad the first sequence based on the first sequence length, the reference signal length, and a determining threshold comprises:

selecting a starting point in a reference signal to insert the first sequence; and inserting N elements at remaining positions in the reference signal, wherein a value of the inserted element comprises each of values of the N elements in the first sequence from the selected starting point multiplied by a fourth phase deflection value or 0, and N is equal to a quantity of the remaining positions.

13. A wireless communication apparatus, comprising:

at least one processor a non-transitory computer-readable storage medium storing a program to be executed by the at least one processor, the program including instructions to:

obtain a first sequence, wherein a value of a length of the first sequence is $2^m$; and pad or truncate the first sequence to determine a second sequence having a reference signal length, wherein the reference signal length is determined based on first resource information; and a transceiver unit, configured to output the second sequence, wherein the second sequence identifies at least one of active users or channel estimation, wherein the first resource information comprises at least one of a number of resource blocks, a resource element, or reference signal pattern indication information, wherein the first sequence comprises at least one of a short first sequence or a long first sequence, wherein a length $L_{short}$ the short first sequence is a value $2^m$ that is not greater than and closest to the reference signal length L, and wherein a length $L_{long}$ of the long first sequence is a value $2^{m+1}$ that is greater than and closest to the reference signal length L, and wherein program instructions to pad or truncate the first sequence comprise program instructions to:

determine at least one of a first sequence second length to be matched as $L_{short\text{-}gap}=L-L_{short}$ or a first sequence third length to be matched as $L_{long\text{-}gap}=L_{long}-L$; and perform at least one of:

comparing a ratio of $L_{short\text{-}gap}$ to $L_{long\text{-}gap}$ with a first determining threshold, and determining to pad or truncate the first sequence based on a first comparison result;

comparing a ratio of $L_{short\text{-}gap}$ to L with a second determining threshold, and determining to pad or truncate the first sequence based on a second comparison result;

comparing a ratio of $L_{long\text{-}gap}$ to L with a third determining threshold, and determining to pad or truncate the first sequence based on a third comparison result;

comparing a ratio of $L_{short\text{-}gap}$ to $L_{short}$ with a fourth determining threshold, and determining to pad or truncate the first sequence based on a fourth comparison result; or comparing a ratio of $L_{long\text{-}gap}$ to $L_{long}$ with a fifth determining threshold, and determining to pad or truncate the first sequence based on a fifth comparison result.

14. The apparatus according to claim 13, wherein the first sequence is a Reed-Muller sequence, and the Reed-Muller sequence is determined based on a binary symmetric matrix with order m and a binary vector.

15. A wireless communication apparatus, comprising:

a transceiver configured to obtain a first sequence, wherein a length of the first sequence is $2^m$, and m is a positive integer; and a logic circuit configured to determine a second sequence based on the first sequence by:

padding or truncating the first sequence to determine the second sequence having a reference signal length, wherein the reference signal length is determined based on first resource information, and wherein the second sequence identifies at least one of active users or channel estimation, wherein the transceiver is further configured to output the second sequence, and wherein the first resource information comprises at least one of a number of resource blocks, a resource element, or reference signal pattern indication information, wherein the first sequence comprises at least one of a short first sequence or a long first sequence, wherein a length $L_{short}$ of the short first sequence is a value $2^m$ that is not greater than and closest to the reference signal length L, and wherein a length $L_{long}$ of the long first sequence is a value $2^{m+1}$ that is greater than and closest to the reference signal length L, and wherein padding or truncating the first sequence comprises:

determining at least one of a first sequence second length to be matched as $L_{short\text{-}gap}=L-L_{short}$ or a first sequence third length to be matched as $L_{long\text{-}gap}=L_{long}-L$; and performing at least one of:

comparing a ratio of $L_{short\text{-}gap}$ to $L_{long\text{-}gap}$ with a first determining threshold, and determining to pad or truncate the first sequence based on a first comparison result;

comparing a ratio of $L_{short\text{-}gap}$ to L with a second determining threshold, and determining to pad or truncate the first sequence based on a second comparison result;

comparing a ratio of $L_{long\text{-}gap}$ to L with a third determining threshold, and determining to pad or truncate the first sequence based on a third comparison result;

comparing a ratio of $L_{short\text{-}gap}$ to $L_{short}$ with a fourth determining threshold, and L determining to pad or truncate the first sequence based on a fourth comparison result; or comparing a ratio of $L_{long\text{-}gap}$ to $L_{long}$ with a fifth determining threshold, and determining to pad or truncate the first sequence based on a fifth comparison result.

16. The wireless communication apparatus according to claim 15, wherein determining to pad or truncate the first sequence based on the first comparison result comprises at least one of:

based on the ratio of $L_{short\text{-}gap}$ to $L_{long\text{-}gap}$ being equal to the first determining threshold, padding the short first sequence or truncating the long first sequence;

based on the ratio of $L_{short\text{-}gap}$ to $L_{long\text{-}gap}$ being less than the first determining threshold, padding the short first sequence; or based on the ratio of $L_{short\text{-}gap}$ to $L_{long\text{-}gap}$ being greater than the first determining threshold, truncating the long first sequence.

17. The wireless communication apparatus according to claim 15, wherein determining to pad or truncate the first sequence based on the second comparison result comprises at least one of:

based on the ratio of $L_{short\text{-}gap}$ to L being equal to the second determining threshold, padding the short first sequence or truncating the long first sequence;

based on the ratio of $L_{short\text{-}gap}$ to L being less than the second determining threshold, padding the short first sequence; or based on the ratio of $L_{short\text{-}gap}$ to L being greater than the second determining threshold, truncating the long first sequence.

18. The wireless communication apparatus according to claim 15, wherein determining to pad or truncate the first sequence based on the third comparison result comprises:

based on the ratio of $L_{long\text{-}gap}$ to L being equal to the third determining threshold, padding the short first sequence or truncating the long first sequence;

based on the ratio of $L_{long\text{-}gap}$ to L being greater than the third determining threshold, padding the short first sequence; or based on the ratio of $L_{long\text{-}gap}$ to L being less than the third determining threshold, truncating the long first sequence.

19. The wireless communication apparatus according to claim 15, wherein determining to pad or truncate the first sequence based on the fourth comparison result comprises:

based on the ratio of $L_{short\text{-}gap}$ to $L_{short}$ to being equal to the fourth determining threshold, padding the short first sequence or truncating the long first sequence;

based on the ratio of $L_{short\text{-}gap}$ to $L_{short}$ being less than the fourth determining threshold, padding the short first sequence; or based on the ratio of $L_{short\text{-}gap}$ to $L_{short}$ being greater than the fourth determining threshold, truncating the long first sequence.

20. The wireless communication apparatus according to claim 15, wherein determining to pad or truncate the first sequence based on the fifth comparison result comprises:

based on the ratio of $L_{long\text{-}gap}$ to $L_{long}$ being equal to the fifth determining threshold, padding the short first sequence or truncating the long first sequence;

based on the ratio of $L_{long\text{-}gap}$ to $L_{long}$ being greater than the fifth determining threshold, padding the short first sequence; or based on the ratio of $L_{long\text{-}gap}$ to $L_{long}$ being less than the fifth determining threshold, truncating the long first sequence.

* * * * *